(12) United States Patent
Mathew et al.

(10) Patent No.: US 11,593,218 B1
(45) Date of Patent: Feb. 28, 2023

(54) SOURCE FILE COPYING AND ERROR HANDLING

(71) Applicant: EMC IP Holding Company LLC, Hopkinton, MA (US)

(72) Inventors: George Mathew, Belmont, CA (US); Philip Shilane, Newtown, PA (US); Abhinav Duggal, Santa Clara, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/492,866

(22) Filed: Oct. 4, 2021

(51) Int. Cl.
*G06F 16/14* (2019.01)
*G06F 11/14* (2006.01)
*G06F 16/174* (2019.01)

(52) U.S. Cl.
CPC ........ *G06F 11/1453* (2013.01); *G06F 16/152* (2019.01); *G06F 16/1752* (2019.01)

(58) Field of Classification Search
CPC ............................ G06F 16/1752; G06F 16/152
See application file for complete search history.

(56) References Cited

U.S. PATENT DOCUMENTS

2010/0114833 A1* 5/2010 Mu ..................... G06F 11/1464
709/201
2011/0258161 A1 10/2011 Constantinescu et al.
2019/0236102 A1 8/2019 Wade et al.
2019/0243547 A1 8/2019 Duggal et al.
2019/0243702 A1 8/2019 Shilane et al.
2021/0258400 A1 8/2021 Therani et al.
2021/0271650 A1* 9/2021 Wang ................... G06F 16/174

* cited by examiner

*Primary Examiner* — Baoquoc N To
(74) *Attorney, Agent, or Firm* — Dergosits & Noah LLP; Todd A. Noah

(57) ABSTRACT

Object service receives request to copy file to destination and identifies group identifier for fingerprints group corresponding to sequential segments in file. Object service communicates request for fingerprints group to deduplication service associated with group identifier range including group identifier. Deduplication service communicates fingerprints group, retrieved from fingerprint storage, to object service, which communicates fingerprints group and group identifier to destination. Object service communicates request for file segments, corresponding to fingerprints missing in destination, communicated from destination, to deduplication service, which communicates requested segments, retrieved from source storage, to object service, which communicates requested segments to destination. System identifies generation identifier associated with time of communicating by object service or deduplication service, and generation identifier associated with another time of communicating by object service or deduplication service. If generation identifier associated with time differs from generation identifier associated with other time, object service or deduplication service restarts communication.

20 Claims, 9 Drawing Sheets

SOURCE FILE COPYING AND ERROR HANDLING

TECHNICAL FIELD

This disclosure relates to storing digital information, and more particularly, to file copying.

BACKGROUND

A data user may copy data in a data center to one or more remote sites, which may be in one or more cloud locations, to have copies of data in case of a data center disaster, and/or the data user may copy data from remote sites to a centralized data center. Data storage systems include recording media that retain digital information, have evolved towards scalable designs that can grow with customer demand by adding storage and computation as necessary, and typically store redundant information. For example, when creating a copy of an enterprise's email system data which includes 100 instances of the same 1 Megabyte (MB) file attachment, a data storage system may store all 100 instances of the same 1 MB file attachment, inefficiently using 100 MB of storage space to store the same 1 MB file attachment. Data deduplication can eliminate redundant copies of information, which can improve the utilization of data storage systems and lower capital expenditure by reducing the total amount of recording media required to meet the capacity needs of data storage systems. Continuing the previous example, a data deduplication system stores only one instance of the same 1 MB file attachment and stores small references to the one stored instance for the 99 subsequent instances.

When being copied from or to a data storage system, a data file or a data object may be divided into data segments. A data deduplication system can receive data segments, compare these received data segments against previously stored data segments, identify which received data segments are unique because they have not been previously stored, and store the unique data segments. When a comparison identifies a received data segment as a duplicate of a data segment that has previously been stored as unique, a data deduplication system replaces the duplicate data segment with a small reference that points to the previously stored data segment.

Data deduplication efficiency depends on the number of duplications within data and how the data is divided for deduplication. For example, a relatively small data segment size enables a data deduplication system to identify more duplicates, and thereby save more recording media storage space. However, dividing a data file or a data object into a large number of small data segments increases the total size of the data segments' metadata because each data segment requires the same amount of metadata, increases the deduplication time required to process large numbers of small data segments, and increases data fragmentation.

Since there are numerous errors which can occur while copying a data file from a source to destination, data file copying systems need to verify that a data file has been correctly copied before ending the copying process. If some data in the file is missing or corrupted, then an important copy of the data file may no longer be available for a data user during a disaster recovery situation. Data file copying systems may respond to an error being detected in the copying of a data file by beginning the process of copying the data file over from the beginning of the copying process. For small data files, this is a reasonable approach, but for large data files which are hundreds of gigabytes (GBs) to terabytes (TBs) in size, resending all of the fingerprints and segments for the data file can take a long time. Therefore, a data file copying system can create checkpoints, and then respond to an error being detected in the copying of a data file by continuing the file copying process from the last checkpoint, without having to restart the file copying process from the beginning.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

DETAILED DESCRIPTION

Figure 1A:
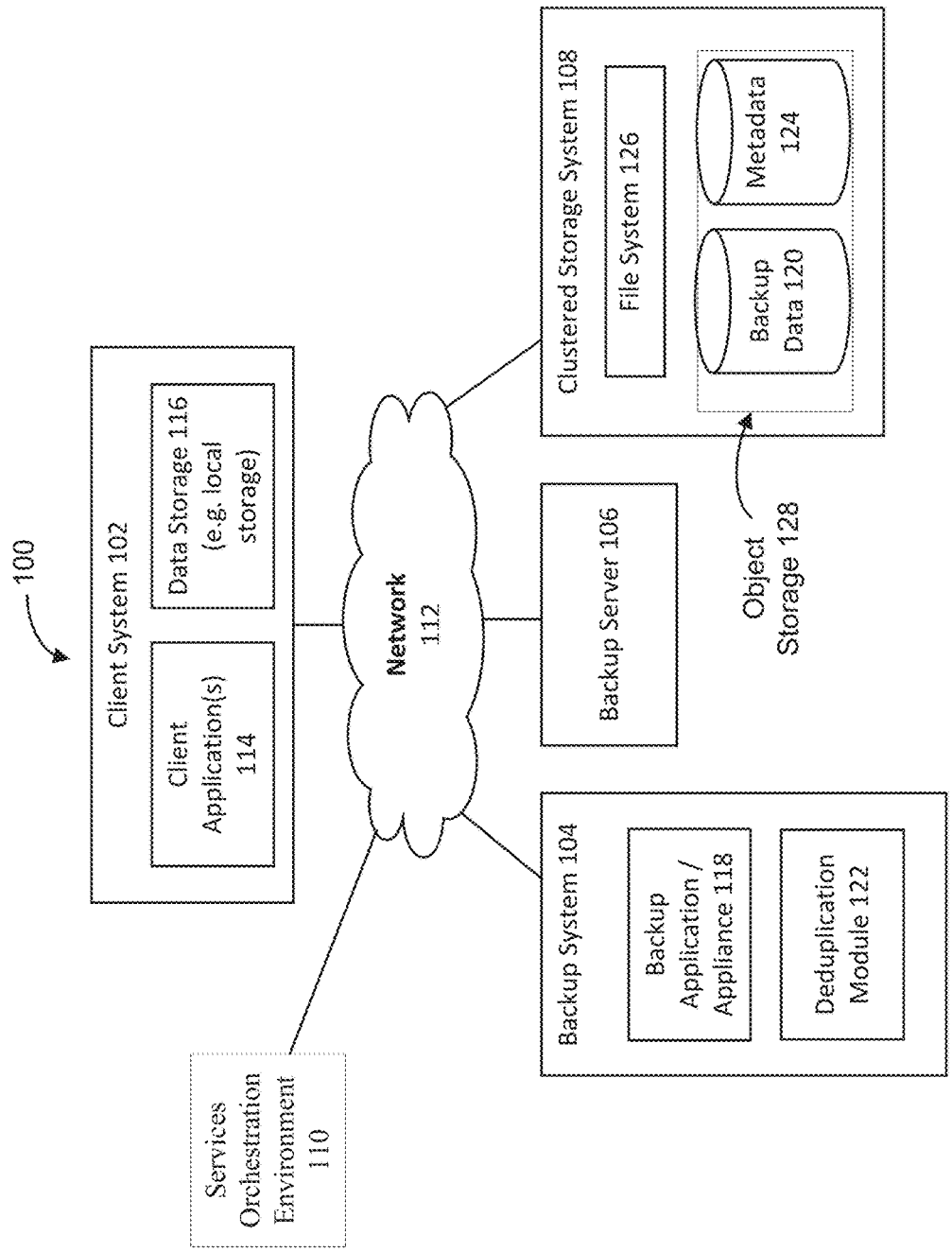
FIG. 1A is a block diagram illustrating an example operating environment for file copying according to one or more embodiments of the disclosure.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

Although these embodiments are described in sufficient detail to enable one skilled in the art to practice the disclosed embodiments, it is understood that these examples are not limiting, such that other embodiments may be used, and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment may be included in at least one embodiment of the disclosure. The appearances of the phrase "embodiment" in various places in the specification do not necessarily all refer to the same embodiment.

In some embodiments, described is a system (and a computer program product and a method) for source file copying and error handling. An access object service receives a request to copy a file to a destination, and then identifies a similarity group identifier for a group of fingerprints corresponding to sequential segments in the file. The access object service communicates a request for the group of fingerprints to a deduplication service which is associated with a range of similarity group identifiers that include the similarity group identifier. The deduplication service communicates the group of fingerprints, which were retrieved from fingerprint storage, to the access object service. The access object service communicates the group of fingerprints and the similarity group identifier to the destination. The access object service communicates a request for segments of the file, which correspond to fingerprints missing in the destination, which was communicated from the destination, to the deduplication service. The deduplication service communicates the requested segments, which were retrieved from a source storage, to the access object service. The access object service communicates the requested segments to the destination.

A system identifies a generation identifier which is associated with a time of communicating by the access object service or the deduplication service. The system identifies a generation identifier which is associated with another time of communicating by the access object service or the deduplication service. If the generation identifier associated with the time differs from the generation identifier associated with the other time, the access object service or the deduplication service restarts at least one communication. Restarting at least one communication may be based on at least one checkpoint associated with at least one of a time of copying the file and an amount of the file copied.

For example, an access object service receives a request to copy a database file from a source, and then uses the name of the file requested to be copied and the named file's metadata to identify an existing similarity group identifier of 483 which the source had already created for a group of fingerprints numbered 1 to 509 in the database file when the database file was copied to the source. The access object service uses the similarity group identifier of 483 to request the fingerprints for the group of fingerprints numbered 1 to 509 from a deduplication and compression service, which supports groups of segments with similarity group identifiers in the range of 0 to 500. The deduplication and compression service retrieves the group of fingerprints numbered 1 to 509 from an underlying shared storage system, and then communicates this group of fingerprints numbered 1 to 509 to the access object service, which communicates this group of fingerprints numbered 1 to 509 and the similarity group identifier of 483 to a destination. The access object service receives a communication of a request from the destination for file segments numbered 2-7, 11-13, and 17-19 because fingerprints numbered 2-7, 11-13, and 17-19 are missing in the destination, and then communicates this request to the deduplication and compression service. The deduplication and compression service retrieves the requested file segments numbered 2-7, 11-13, and 17-19 from the underlying shared storage system, compresses these requested file segments into compression regions, and communicates these compression regions to the access object service, which communicates these compression regions that include the requested segments to the destination.

The access object service records the generation identifier of 12 for the deduplication and compression service when requesting the group of fingerprints numbered 1 to 509 from the deduplication and compression service. The access object service records the generation identifier of 14 for the deduplication and compression service when receiving a communication of the file segments numbered 2-7, 11-13, and 17-19, compressed into compression regions, from the deduplication and compression service. The access object service determines that the deduplication and compression service restarted during the copying of the data file because the generation identifier of 12 for the deduplication and compression service changed to 14 from the first to the last communication with the deduplication and compression service. The only communication resent occurs when the access object resends the last segments from the deduplication and compression service because the time when the deduplication and compression service restarted and received the new generation identifier of 14 was immediately before the deduplication and compression service sent the last segments. This time was also hours after the copying of the file began and corresponds to checkpoint which was created after the number of fingerprints sent to the destination correspond to more than 1,000 MB (1 GB), of data segments.

In some embodiments, such a system may be provided within an operating environment. An example of such an operating environment is further described herein with reference to FIG. 1A. However, in general, embodiments of the disclosure may include and/or be implemented in an operating environment that includes a services orchestration environment, and that may include a data protection operating environment which includes a backup and clustered storage environment. For example, at least some functionality may be provided by, or implemented in connection with, various platforms for data protection platform provided by Dell EMC™ Corporation, and associated systems, methods, and components, although use of this particular platform is provided only by way of illustration and is not required.

In some embodiments, the services orchestration environment may take the form of a cloud environment. However, in some embodiments the services orchestration environment may be implemented in an on-premises environment, and/or hybrid environments that include public and private elements. In addition, the services orchestration environment and/or operating environment may take the form of an environment that is partly, or completely, virtualized. The operating environment may include one or more host devices that each host one or more applications used by a client in the operating environments.

As such, a particular client may employ, or otherwise be associated with, one or more instances of each of one or more applications. In general, the applications employed by the clients are not limited to any particular functionality or type of functionality. Some example applications may include database applications such as a SQL Server, filesystems, as well as other types of data stores. The applications on the clients may create new and/or modify existing data, which is data to be protected.

Any of the devices, including the clients, servers, and hosts, in the operating environment can take the form of software, physical machines, or virtual machines, or any combination thereof, though no particular device implementation or configuration is required for any embodiment. Similarly, data protection system components such as databases, storage servers, storage volumes, storage disks, backup servers, restore servers, backup clients, and restore clients can likewise take the form of software, physical machines, or virtual machines, though no particular component implementation is required for any embodiment. Where virtual machines are employed, a hypervisor or other virtual machine monitor may be employed to create and control the virtual machines.

As used herein, the term "data" is intended to be broad in scope. Accordingly, data may include data objects (or objects), data segments (or segments) such as may be produced by data stream segmentation processes, data chunks, data blocks, atomic data, emails, data files, contacts, directories, sub-directories, volumes, etc. In some embodiments, the terms "file," "data file," "object," and "data object" may be used interchangeably.

In addition, the term "backup" (or "data backups," "backed-up data," etc.) is intended to be construed broadly and includes, but is not limited to, partial backups, incremental backups, differential backups, full backups, clones, snapshots, any other type of copies of data, and any combination of the foregoing. Any of the foregoing may, or may not, be deduplicated. In addition, the storage of data can employ any suitable storage technique, infrastructure, hardware such as a solid-state drive, and/or a hard disk drive, or virtual storage systems provided by a cloud service provider.

Exemplary Environments

More specifically, and with reference to FIG. 1A, shown is a block diagram illustrating an example of an operating environment 100 for distributing phases of file copying within a clustered storage environment according to one or more embodiments of the disclosure. As shown, the operating environment 100 may include a client system 102, a backup system 104, a backup server 106, a clustered storage system 108, and a services orchestration environment 110, which may interact via a network 112, which may be any type of wired or wireless network including a local area network (LAN), a wide area network (WAN), or a direct communication link, or other suitable connection.

As shown, the operating environment 100 may include a client or client system (or computer, or device) 102 that may be associated with a client or customer of a data backup and protection service, and the backup system 104 that may be associated with a data backup and protection service provider. For example, the client system 102 may provide computing resources (such as databases) for users (such as website visitors) of the customer, and data which may be protected by the backup and data protection service provider. Accordingly, the client system 102 may function as a client from which backups are performed. In some embodiments, the client system 102 may comprise a virtual machine.

In addition, the client system 102 may host one or more client applications 114, and may include data storage 116, as well as an interface for communicating with other systems and devices, such as the backup system 104. In general, the client applications 114 may create new and/or modified data that is desired to be protected. As such, the client system 102 is an example of a host device. The data storage 116 may be used to store client data, which may, along with the client system 102 (such as the client applications 114), be backed up using the backup system 104.

As further described herein, components of the client system 102 (such as the client applications 114 and the data storage 116) may be a data source, or be associated with one or more data sources such as a database, a virtual machine, and a storage device. In addition, components of the client system 102 may be data sources that are associated with the client system 102, but these components may reside on separate servers, such as a data server, or a cloud-computing infrastructure. The client system 102 may include a backup client application, or plug-in application, or Application Programming Interface (API) that cooperates with the backup system 104 to create backups of client data. The backed-up data can also be restored to the client system 102.

In at least one embodiment, the backup system 104 may represent one or more components of a Data Domain Restorer-based deduplication storage system, and a backup server 106 may be implemented in conjunction with a Data Domain deduplication storage server provided by Dell EMC for use with Data Domain Restorer storage devices. For example, the backup server 106 may be a stand-alone entity, or may be an element of the clustered storage system 108. In some embodiments, the backup server 106 may be a Dell EMC Avamar server or a Dell EMC Networker server, although no particular server is required, and other backup and storage system configurations are contemplated.

The backup system 104 may include a backup application (or appliance) 118 that performs, manages, or coordinates the creation and restoration of data that may be backed-up. For example, data to be backed-up from the client system 102 may be communicated from the client system 102 to the backup application 118 for initial processing, after which the processed data, such as backup data 120, is uploaded from the backup application 118 for storage at the clustered storage system 108. In some embodiments, the backup application 118 may cooperate with a backup client application of the client system 102 to back up client data to the clustered storage system 108. The backup application 118 may also cooperate with a backup client application to restore backup data from the clustered storage system 108 to the client system 102.

In some embodiments, the backup application 118 may be a part of, or work in conjunction with, a storage appliance. For example, the storage appliance may include a Dell EMC Cloud Boost appliance, although any suitable appliance is contemplated. In addition, the backup application 118 may provide a variety of useful functionalities such as source-side data deduplication, data compression, and WAN optimization boost performance and throughput, while also possibly reducing the consumption and cost of network bandwidth and cloud storage capacity.

One, some, or all, of these functions of the backup application 118 may be performed using deduplication logic via a deduplication module 122. For example, the deduplication module 122 can provide data segmentation, as well as in-flight encryption as the data is sent by the backup application 118 to the clustered storage system 108. However, as further described herein, in some embodiments, data deduplication may be performed entirely within the clustered storage environment 108. It should be noted that the backup application (or storage appliance) 118 may be implemented in various forms, such as a virtual, physical, or native public cloud appliance to fit the requirements of a particular configuration, and the backup application 118 may be used with various types of data protection environments, including public and private object storage clouds.

The clustered storage system 108, as further described herein, may store backup data 120 (backup files or backup objects) within a one or more nodes, as further described herein. As shown, the clustered storage system 108 may also store metadata 124 for (or associated with) the backup data 120, and one or more instances of a filesystem 126 that catalogs backup files and other data residing in the clustered environment. In general, the storage of the backup data 120 may be configured to store data backups for the client system 102, which may be restored in the event of a loss of data. The clustered storage system 108 may be a file storage system or an object storage system that includes file storage 128 or object storage 128, as further described herein.

Figure 1B:
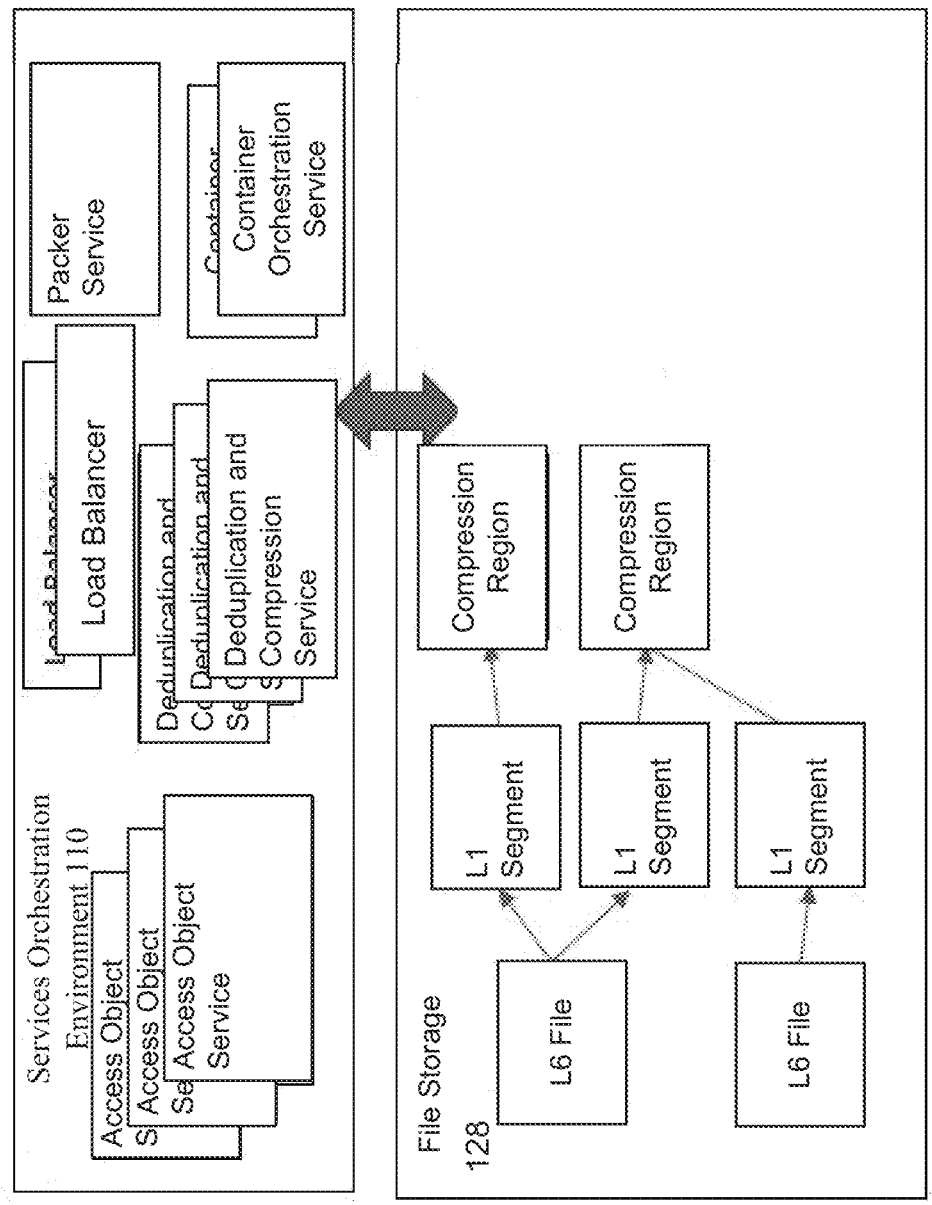
FIG. 1B is a block diagram illustrating parts of an example operating environment for file copying according to one or more embodiments of the disclosure.

As shown in FIG. 1B, the services orchestration environment 110 (such as a Kubernetes cloud computing environment) may provide for the deployment of various types of services. The services orchestration environment 110 may enable the deployment of services for file copying and for conditional storage in the file storage 128 or the object storage 128.

L6 Files or Objects, L1 Segments, & L0 Compression Regions

In various embodiments, when a client copies a data object or data file to a destination, the data object or data file may be divided into data segments. A deduplication system typically does not determine whether any such data segment is a duplicate data segment or a unique data segment by directly comparing this data segment against previously stored data segments which were previously determined to be unique data segments. For example, a deduplication system would waste system resources by directly comparing thousands of bytes in each of many data segments which were formed from a client's data object or data file against thousands of bytes in millions of data segments which have already been identified and stored as unique data segments. Instead, a fingerprint that uniquely identifies a data segment may be generated for each data segment, such as by applying a SHA-1 hash function to create a unique 20-byte fingerprint for each data segment. Consequently, a deduplication system can conserve system resources by more efficiently comparing 20-byte fingerprints for each of many data segments formed from a client's data object or data file against 20-byte fingerprints for millions of data segments which have already been identified and stored as unique data segments.

If a client generates fingerprints for its data segments, the client can communicate these fingerprints, instead of its data segments, to a front-end service for a deduplication system. However, if a client does not generate fingerprints for its data segments, the client communicates the data segments to a front-end service. If a front-end service receives a communication of fingerprints for data segments from a client, the front-end service communicates these fingerprints to a back-end service for deduplication. However, if a front-end service receives a communication of data segments instead of their fingerprints from a client, the front-end service may communicate the data segments to a back-end service for deduplication, or the front-end service may generate the fingerprints for the data segments, and then communicate these fingerprints to the back-end service.

If a back-end service receives a communication of fingerprints for data segments, the back-end service uses the fingerprints for deduplication of the data segments. However, if a back-end service receives a communication of data segments instead of the data segments' fingerprints, the back-end service generates the fingerprints for the data segments and then uses the fingerprints for deduplication of the data segments. An advantage of a client or a front-end service generating fingerprints for data segments, such that a back-end service does not have to generate these fingerprints, is a significant reduction in communication volume and time. For example, if a client or a front-end service generates a 20-byte SHA-1 hash fingerprint for a typical 8,000-byte data segment, the amount of bytes that the client or the front-end service has to communicate for the content of this typical data segment is reduced by 99.75%, from 8,000 bytes to 20 bytes. Consequently, since a client that generates fingerprints for data segments can significantly reduce the amount of bytes communicated to a front-end service and to a back-end service, embodiments of the disclosure copy files by configuring sources to generate fingerprints for the file segments to be copied to a destination, and to communicate these fingerprints to the destination.

Whether a back-end service receives a communication of fingerprints for data segments or generates the fingerprints for the received data segments, the back-end service compares these newly received fingerprints against previously generated fingerprints for previously stored data segments that were previously identified as unique. These comparisons determine which of the newly received fingerprints are unique, and therefore were generated for data segments which are unique, and which of the newly received fingerprints are duplicates, and therefore were generated for data segments which are duplicates. Upon the identification of unique fingerprints generated for the data segments that are unique, the back-end service can communicate this identification of unique data segments to a front-end service, which can communicate this identification of unique data segments to a client. Then the unique data segments may be stored in a compressed format in a compression region by a client, a front-end service, or a back-end service, whichever entity currently retains the data segments which were just identified as unique segments.

Figure 2:
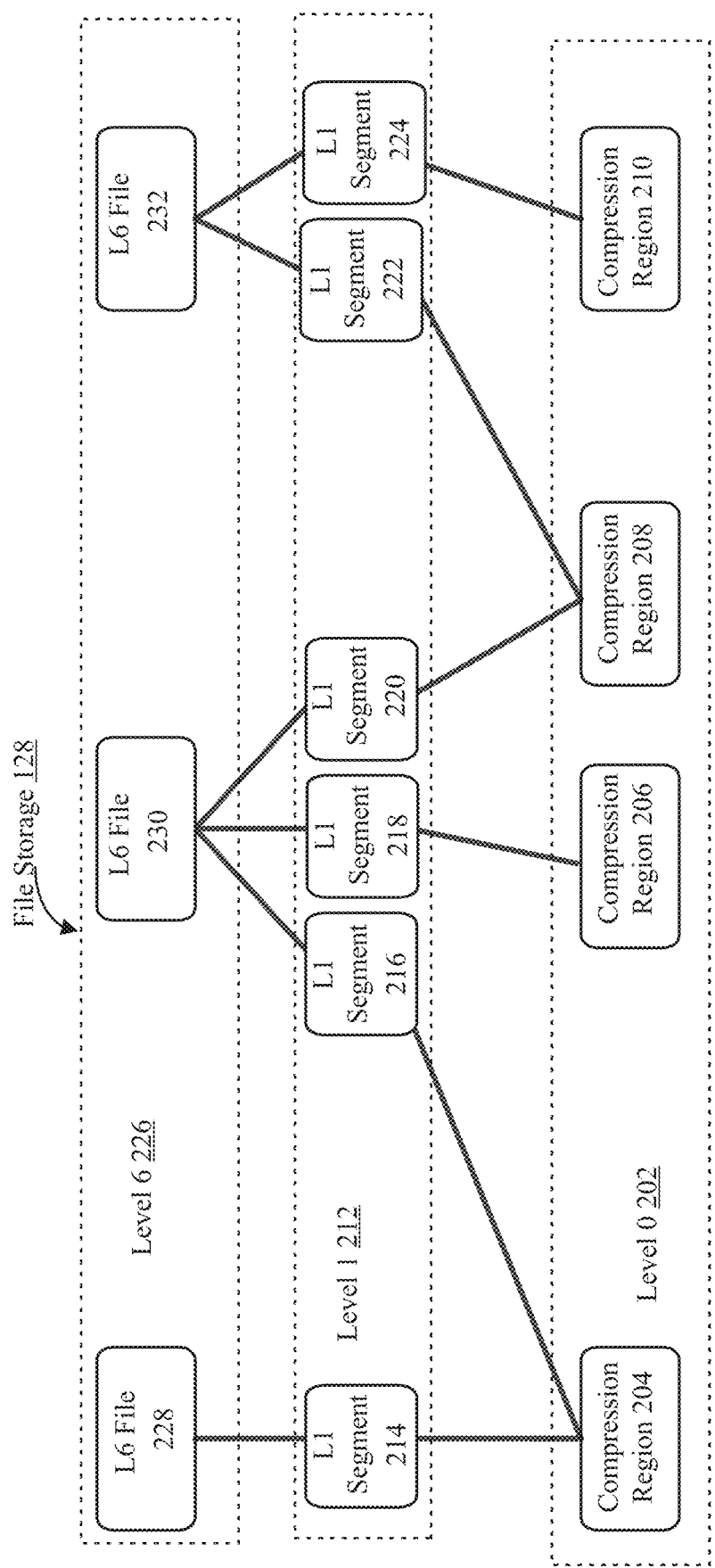
FIG. 2 is a block diagram illustrating relationships between L6 files or objects, L1 segments, and L0 compression regions for file copying according to one or more embodiments of the disclosure.

FIG. 2 depicts that a portion of the file storage 128 or the object storage 128 may be represented by Level 0 202, which may include compression regions 204-210. Each compression region may store unique data segments that have been compressed and each compressed data segment's corresponding unique fingerprint and data segment size.

A data file or data object may be represented by a Merkle tree with the bottom level of the Merkle tree representing the data segments, which may be referred to as level 0 data segments or L0 data segments. Large numbers of sequential fingerprints, such as 20-byte SHA-1 hash fingerprints, generated for sequential data segments, may be grouped together at the next higher level of the Merkle tree to form groups of fingerprints for data segments, which may be referred to as a level 1 segment or a L1 segment. The fingerprints of the groups of data segments that form L1 segments may be grouped together as a level 2 fingerprints for data segment or a L2 segment, and this process of grouping fingerprints for increasingly larger groups of data segments may continue up to level 6 or L6, which represents the entire data file or data object.

The top of a Merkle tree is referred to as an L6 file or object, even though it may actually refer to fingerprints for groups of data segments in a lower numbered level. Fingerprints for segments which are above L0 may be referred to as LP segments. While multiple L0 data segments may be compressed into 64-kilobyte (KB) to 128 KB sized compression regions, LP segments are not compressed because fingerprints, such as 20-byte SHA-1 hash fingerprints, are quite random and do not compress well.

Since either a sequence of a file's data segments or a sequence of the data segments' fingerprints may be used for forming a L1 segment and/or determining a similarity group identifier, a source can communicate these fingerprints without communicating these data segments when L1 segments are to be formed and similarity group identifiers are to be determined. A similarity group identifier may be used to route a L1 segment to a back-end service that is uniquely responsible for each L1 segment which has a similarity group identifier that is within a range of similarity group identifiers.

FIG. 2 depicts that a portion of the file storage 128 or the object storage 128 may be represented by Level 1 212, which may include L1 segments 214-224. Each L1 segment may store metadata that identifies the data object or data file to which a particular L1 segment belongs, a reference to a similarity group identifier, and a fingerprint array that stores those fingerprints included in a L1 segment and the sizes of each data segment represented by each fingerprint. FIG. 2 depicts that a portion of the file storage 128 or the object storage 128 may be represented by Level 6 226, which may include L6 files 228-232. Each data file or data object has a corresponding L6 file or object, which may reference the one or more L1 segments associated with the data object or data file, since the associated L1 segments are based on an array of fingerprints of the data segments which comprise the data object or data file.

Deduplication happens when different data files or data objects refer to the same L0 data segments and LP segments. For example, if two data files are exactly the same, they would have the same L6 fingerprints. However, if two data files only partially overlap in their data, then some branches of the Merkle tree will be identical, with the same LP fingerprints and the same L0 data segments, while other branches of the Merkle tree will be different, with different LP fingerprints and different L0 data segments.

For a system with a single node, a L1 segment may be formed based on fixed offsets within data objects or data files, regardless of data segment boundaries. Since L1 segments are all processed within a single back-end node, such a formation may have little impact on overall deduplication ratios, despite the partial data segments which may occur at the ends and the beginnings of the groups of data segments that form L1 segments. For a system with multiple back-end nodes, a L1 segment may be formed by evaluating a feature value (such as a hash of the first 64 bytes) of each data segment for forming the L1 segment until the feature value of one of the data segments satisfies criteria for forming a group of data segments, such as by the first data segment which has a feature value that matches a bit pattern mask. For example, a data segment which has the feature value that matches the bit pattern mask will serve as a boundary between where the data segments end for forming the current L1 segment and the data segments begin for forming the next L1 segment, which typically results in the L1 segments storing fingerprints for groups of data segments that range from 0.5 MB to 2.0 MB.

Then a feature value for a data segment for forming a L1 segment (such as a hash of the first 64 bytes of the first data segment for forming a L1 segment) may be used as the basis for determining a similarity group identifier to route the L1 segment to the appropriate back-end service. Using a hash of a representative portion of a data segment can result in L1 segments for data that are similar, but not identical, being routed to the same back-end service. The net effect of such routing may be to improve deduplication while increasing skew. Using a feature value for the first data segment for forming a L1 segment has the advantage that it is not necessary to buffer all data segments for forming a group of data segments that form a L1 segment before deciding where to route the L1 segment, something that matters when hundreds or thousands of data segments are being processed simultaneously. Collisions are acceptable when using a hash function for routing L1 segments rather than using a hash function for deduplication, so a system can base a similarity group identifier on the first 32-bit word of a 20-byte SHA-1 hash for the first 64 bytes in the first data segment in a group of data segments that form a L1 segment.

Figure 3:
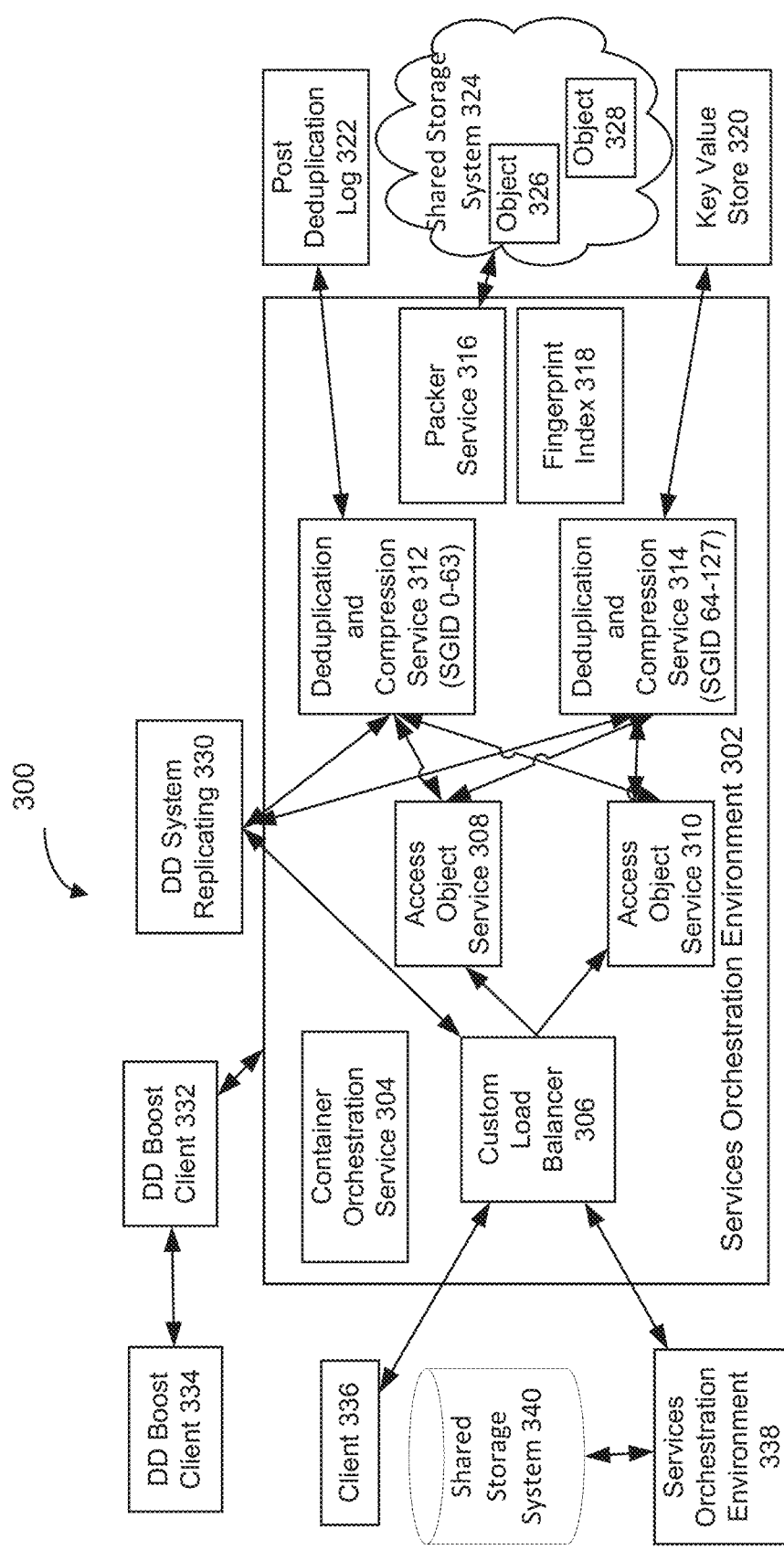
FIG. 3 is a block diagram illustrating a system for file copying according to one or more embodiments of the disclosure.

A simplified diagram of the architecture for the system 300 is depicted in FIG. 3. A services orchestration environment 302 may be implemented on one or multiple physical or virtual nodes, either on premises with dedicated hardware or in a public cloud environment. A container orchestration service 304, such as Kubernetes, may execute services or micro-services inside the services orchestration environment 302 as containers.

The services orchestration environment 302 may include a custom load balancer service or micro-service 306, access object services or micro-services 308 and 310, deduplication and compression services or micro-services 312 and 314, a packer service or micro-service 316, and a fingerprint index 318. FIG. 3 depicts the services orchestration environment 302 with one custom load balancer service 306, two access object services 308 and 310, two deduplication and compression services 312 and 314, one packer service 316, and one fingerprint index 318. However, the services orchestration environment 302 may include any number of custom load balancer services 306, any number of the access object services 308 and 310, any number of the deduplication and compression services 312 and 314, any number of the packer service 316, and any number of the fingerprint index 318. Each of the deduplication and compression services 312 and 314 include a deduplication service and a compression service.

The services orchestration environment 302 may communicate with a key value store 320, a post deduplication log 322, a shared storage system 324 that stores objects 326 and 328, a Data Domain system replicating 330, a Data Domain Boost client 332 that communicates with another Data Domain Boost client 334, a client 336, and another services orchestration environment 338 that communicates with another shared storage system 340. FIG. 3 depicts the system 300 as including two services orchestration environments 302 and 338, one key value store 320, one post deduplication log 322, two shared storage systems 324 and 340, two objects 326 and 328, one Data Domain system replicating 330, two Data Domain Boost clients 332 and 334, and one client 336. However, the system 300 may include any number of services orchestration environments 302 and 338, any number of key value store 320, any number of post deduplication log 322, any number of shared storage systems 324 and 340, any number of objects 326 and 328, any number of Data Domain system replicating 330, any number of Data Domain Boost clients 332 and 334, and any number of client 336.

When copying a file from the source Data Domain Boost client 334 to the destination Data Domain Boost client 332, the source Data Domain Boost client 334 communicates all the L1 fingerprints for the file's segments necessary to recreate the file at the destination Data Domain Boost client 332, and the destination Data Domain Boost client 332 uses all the currently received L1 fingerprints to form the upper LP segments for the file. The destination Data Domain Boost client 332 compares all the newly received L1 fingerprints to its previously stored fingerprints, identifies the newly received L1 fingerprints which are missing from its previously stored fingerprints at the destination, and returns the missing fingerprints to the source Data Domain Boost client 334. The source Data Domain Boost client 334 receives the missing fingerprints from the destination Data Domain Boost client 332, retrieves the file's L0 data segments that correspond to the missing fingerprints, and communicates the missing L0 data segments to the destination Data Domain Boost client 332 which stores the missing L0 data segments needed to copy the file from the source Data Domain Boost client 334 to the destination Data Domain Boost client 332.

When beginning to copy a file to the services orchestration environment 302, the source Data Domain Boost client 332 communicates the fingerprints for the L0 data segments through the custom load balancer 306 in front of the Access object services 308 and 310. Based on a hash of the file handle or other information for the file being copied, the custom load balancer 306 will route the copy traffic to one of the access object services 308 or 310, in a consistent manner so that future writes and/or reads of the same data file or data object will be routed consistently to the same access object service 308 or 310. This consistent routing by the custom load balancer 306 enables the access object services 308 and 310 to cache state in memory that may be reused for recesses and avoids expensive locking. The access object services 308 and 310 will use the fingerprints for the L0 data segments to form the LP Merkle tree and update the directory manager for the tree.

The access object service 308 or 310 can divide the received communication of a stream of fingerprints for the file being copied into L1 segments that correspond to consecutive data segments, which may be an average of 8 KB in size, depending on system properties because L1 segments are distributed to deduplication and compression service 312 or 314, which may be on different physical nodes. Since a L1 segment is of a variable size and aligns with a L0 data segment boundary, the access object service 308 or 310 may determine feature values for the received communication of a stream of fingerprints and then use the feature values as the basis for forming a L1 segment and determining a similarity group identifier. The access object service 308 or 310 can use a similarity group identifier to route a L1 segment to a deduplication and compression service 312 or 314 which is uniquely responsible for L1 segments that have a similarity group identifier that is in the range of similarity group identifiers for the deduplication and compression service 312 or 314.

As depicted in FIG. 3, if a similarity group identifier of 25 is determined for a L1 segment, then the access object service 308 or 310 routes the L1 segment to the deduplication and compression service 312, which processes L1 segments that have similarity group identifiers in the range of 0 to 63. In another example, if a similarity group identifier of 64 is determined for a L1 segment, then the access object service 308 or 310 routes the L1 segment to the deduplication and compression service 314, which processes L1 segments that have similarity group identifiers in the range of 64 to 127. Consistent routing enables the deduplication and compression services 312 and 314 to cache state to accelerate the deduplication process and avoid locking.

Achieving high levels of deduplication requires forming L1 segments, determining a similarity group identifier for each L1 segment, and routing each L1 segment to the appropriate deduplication and compression service 312 or 314 in a consistent manner. After a L1 segment is formed from the fingerprints for a data object or data file, future data objects or data files should have the same L1 segment boundaries in areas that are unmodified in the data objects or data files so that duplicate data segments may be identified. Since deduplication of L1 segments may reduce metadata overheads, forming L1 segments consistently also supports L1 segment deduplication.

There are several guiding principles when forming a L1 segment and determining a similarity group identifier. L1 segments should be formed from the fingerprints for the content of data objects or data files so that the formation is consistent for each data object or data file. L1 segments should store fingerprints for groups of data segments that have a minimum size and maximum size. A similarity group identifier should be determined for a L1 segment so that the determination is consistent for each L1 segment. The L1 segment formation and similarity group identifier determination should have low computational costs.

For Data Domain Boost, replication, and typical write paths, an access object service 308 or 310 does not have to generate the fingerprints required for the data segments because the access object service 308 or 310 already has access to client-generated fingerprints based on the 20-byte SHA-1 hash of each data segment. An access object service 308 or 310 can use a fingerprint which has already been generated for each data segment as the basis for forming L1 segments from fingerprints for groups of data segments and as the basis for determining a similarity group identifier for each L1 segment. An access object service 308 or 310 can go from left to right in the array of the received communication of a stream of fingerprints, skipping over fingerprints until the minimum size of a group of data segments for forming a L1 segment is reached.

Then an access object service 308 or 310 can determine a feature value for each subsequent fingerprint in the array. An example of a feature value is bytes 8-11 of a fingerprint of a data segment, which may have already been generated as a 20-byte SHA-1 hash of the data segment. The range of the value of such a 4-byte feature value is 0 to 4,294 billion.

If the currently processed fingerprint's feature value is larger than any feature value previously determined for previous fingerprints in the array which are for forming the current L1 segment, an access object service 308 or 310 can retain that feature value as the maximal feature value for forming the current L1 segment. An access object service 308 or 310 can also retain information identifying the position in the array of the fingerprint corresponding to the maximal feature value for forming the current L1 segment. An access object service 308 or 310 can continue determining the feature values for fingerprints from left to right in the array of fingerprints which are for forming the current L1 segment until the total size of the fingerprints for forming the current L1 segment reaches the maximum size of a group of fingerprints for forming any L1 segment. An access object service 308 or 310 can use the position of the fingerprint with the maximal feature value for forming the current L1 segment as the position that divides between the fingerprints for forming the current L1 segment and the fingerprints for forming the next L1 segment.

This example describes using the maximal value of the feature values that were determined for the specified subsection of fingerprints for forming the current L1 segment to identify the position of the fingerprint that divides fingerprints for forming the current L1 segment from the fingerprints for forming the next L1 segment. However, mathematical relationships other than the maximal value of these feature values may be used for forming the current L1 segment. For example, the minimal value of the feature values that were determined for the specified subsection of fingerprints for forming the current L1 segment may be used to identify the position of the fingerprint that divides the fingerprints for forming the current L1 segment from the fingerprints for forming the next L1 segment. Additional examples of the relationships to the feature values that may be used for forming the current L1 segment include the second highest value of the feature values, the second lowest value of the feature values, the third highest value of the feature values, and the third lowest value of the feature values, etc., for forming the current L1 segment.

The fingerprint that is identified as dividing the fingerprints for forming the current L1 segment from the fingerprints for forming the next L1 segment may be selected as either the ending fingerprint for forming the current L1 segment or as the beginning fingerprint for forming the next L1 segment. However, the same selection of the ending fingerprint for forming the current L1 segment or the beginning fingerprint for forming the next L1 segment must be consistently applied to the fingerprints for subsequent data objects or data files. Consequently, the boundaries of fingerprints for forming L1 segments are determined consistently for every data object or data file. If a user modifies data that is in only one data segment, and 1,000 data segments which average 8 KB in size are combined in a group of data segments that is 8 MB in size, the probability that the modified data segment is also the data segment which has the fingerprint with the maximal (or minimal) feature value for forming the current L1 segment is 1 divided by 1,000. Therefore, such a modification is highly unlikely to change the ending boundary for forming the L1 segment that corresponds to the fingerprint for the modified data segment and the beginning boundary for forming the subsequent L1 segment.

Therefore, an access object service 308 or 310 can consistently form L1 segments by basing a feature value on a 20-byte SHA-1 hash fingerprint for each data segment in the specified subsection of fingerprints for forming the current L1 segment. Then an access object service 308 or 310 can use the feature value to identify the fingerprint that is used to divide the group of fingerprints for forming the current L1 segment from the group of fingerprints for forming the subsequent L1 segment. Likewise, an access object service 308 or 310 can consistently route L1 segments by basing an additional feature value on a 20-byte SHA-1 hash fingerprint for each data segment in the specified subsection of fingerprints for forming the current L1 segment. Then an access object service 308 or 310 can use the additional feature as the basis to determine a similarity group identifier that is used to route the current L1 segment to the deduplication and compression service 312 or 314 which is uniquely responsible for L1 segments with the determined similarity group identifier.

For example, the maximal value of the bytes 8-11 from the fingerprints, which were generated by applying a 20-byte SHA-1 hash to each data segment in the specified subsection of data segments for forming the current L1 segment, was used to select the fingerprint that divides the fingerprints for forming the current L1 segment from the fingerprints for forming the next L1 segment. Based on this example, an access object service 308 or 310 can use the bytes 4-7 from the same 20-byte SHA-1 hash fingerprint for the same selected fingerprint as the basis for determining a similarity group identifier for routing the current L1 segment. In an alternative example, an access object service 308 or 310 can use the second highest value of the bytes 8-11 from the same 20-byte SHA-1 hash fingerprints as the basis for determining a similarity group identifier for routing the current L1 segment.

These examples describe using the maximal value and the second highest values of the 4 bytes from the fingerprints that were generated for each data segment in the specified subsection of data segments for forming the current L1 segment to determine a similarity group identifier for routing the current L1 segment for deduplication. However, mathematical relationships other than the maximal value or the second highest value of any part or all of each fingerprint may be used as an additional feature for determining the similarity group identifier for routing the current L1 segment for deduplication. For example, the minimal value of any part or all of each fingerprint that was generated for each data segment in the specified subsection of data segments for forming the current L1 segment may be used to determine a similarity group identifier for routing the current L1 segment. Additional examples of the mathematical relationships to any part or all of each fingerprint that may be used for routing the current L1 segment for deduplication include the second lowest value, the third highest value, or the third lowest value of any part or all of each fingerprint that was generated for each data segment in the specified subsection of data segments for forming the current L1 segment.

Since a similarity group identifier may be determined based on the values of 4 selected bytes, which form the alternative feature values, and which range from 0 to 4.294 billion, an access object service 308 or 310 can transform the selected alternative feature value's range of values to fall in the range of zero up to the highest number of similarity groups supported, such as 1,000. For example, an access object service 308 or 310 can apply a mod operator (such as the remainder after a value is divided by 1,000) to transform the selected alternative feature values to a similarity group identifier's value.

The deduplication and compression service 312 or 314 compares the newly received fingerprints against previously received fingerprints which were previously identified as unique fingerprints, and then determine which of the newly received fingerprints are unique, and therefore which of the corresponding data segments are unique. For example, the deduplication and compression service 312 selects one fingerprint from a part of the newly received L1 segment which corresponds to 1 MB of data segments, and then uses the selected fingerprint to query the fingerprint index 318 for the similarity groups identifiers for the deduplication and compression service 312. The fingerprint index 318 maps from <fp, simgroup>-><location where the segment is stored>. The location where the segment is stored consists of several numbers such as object ID, compression region offset, and compression region size. The deduplication and compression service 312 can use that location information as a key to another index that has the group of fingerprints stored for the part of the object surrounding the fingerprint. If the result from using the selected fingerprint to query the fingerprint index 318 is a key, then the deduplication and compression service 312 uses the key to load fingerprints previously determined to be unique from the local key value store 320, loads these unique fingerprints to an in-memory cache, and compares each of the newly received fingerprints against the unique fingerprints in the cache to identify which newly received fingerprints are missing from the unique fingerprints in the cache.

If a user had modified data that is in only one data segment of 1,000 data segments which are combined in a L0 group of data segments that corresponds to a L1 group of 1,000 fingerprints, the probability that the modified data segment is also the data segment for which the fingerprint was generated and subsequently selected for querying the fingerprint index 318 is 1 divided by 1,000. Therefore, such a modification is highly unlikely to result in generating a fingerprint that is not in the fingerprint index. If the result of using the selected fingerprint to query the fingerprint index 318 is not a key, then the deduplication and compression service 312 processes each of the recently received fingerprints as unique fingerprints or missing fingerprints. If the one fingerprint selected from the L1 group of 1,000 fingerprints is not in the fingerprint index 318, the probability is that the user had modified significantly more than one data segment for which fingerprints were generated in the L1 group of 1,000 fingerprints.

The deduplication and compression service 312 or 314 communicates the L1 segments' missing fingerprints back to the access object service 308 or 310, which communicates a request to the source for the L0 data segments which correspond to the missing fingerprints. The source loads the requested file segments, compresses the requested file segments into compression regions, and communicates the compression regions to the services orchestration environment 302. The custom load balancer 306 routes the compression regions for the file to the same access object service 308 that is processing the specific L1's fingerprints, which uses the similarity group identifier to communicate the compression regions to the same deduplication and compression service 312 which requested the file segments, and which stores the compression regions in the post-deduplication log 322. Alternatively, the source could communicate the compression regions directly to the appropriate deduplication and compression service 312 instead of bouncing through the custom load balancer 306 and the access object service 308. The packer service 316 reviews the post-deduplication log 322 for recently received compression regions, packs recently received compression regions into containers or large objects, and then stores the containers such as the large objects 326 and 328 to the underlying shared storage system 324, which may be a private or public object storage system or other highly-available shared storage system that can scale to the needed size and provide data access even if there are underlying hardware failures.

Instead of the access object service 308 or 310 determining feature values for the received communication of a stream of fingerprints and then using the feature values as the basis for forming a L1 segment and determining a similarity group identifier, this feature value logic may be moved to the source of files to be copied, such as the Data Domain Boost client 332, which may then form the L1 boundaries and generate the similarity group identifier for the file being copied. Remote procedure calls, handshakes, flags, or other protocols may be used to configure the services orchestration environment 302 to recognize in advance, or upon receipt of a stream of fingerprints, which sources of files will form L1 segments and determine the similarity group identifier for the L1 segment, such that the access object service 308 or 310 can use any already generated similarity group identifier to route any already formed L1 segment to the appropriate deduplication and compression services 312 and 314.

FIG. 3 also depicts a Data Domain Boost client 332 with communication paths to the custom load balancer service 306 and multiple deduplication and compression services 312 and 314. In Data Domain, metadata for a data segment may referred to as a seg_ref, and include the data segment's 20-byte SHA-1 hash fingerprint, the data segment's 4-byte XOR (exclusive or) value, the data segment's size, and a few other bytes. When a Data Domain Boost client typically writes data into a Data Domain system, the Data Domain Boost client forms data segments, generates the seg_refs, and communicates the seg_refs to the Data Domain system, which performs deduplication and responds by identifying the newly formed data segments which are unique. The Data Domain Boost client then creates compression regions, compresses the identified unique data segments in the compression regions, and communicates the compression regions to the Data Domain system.

Figure 4:
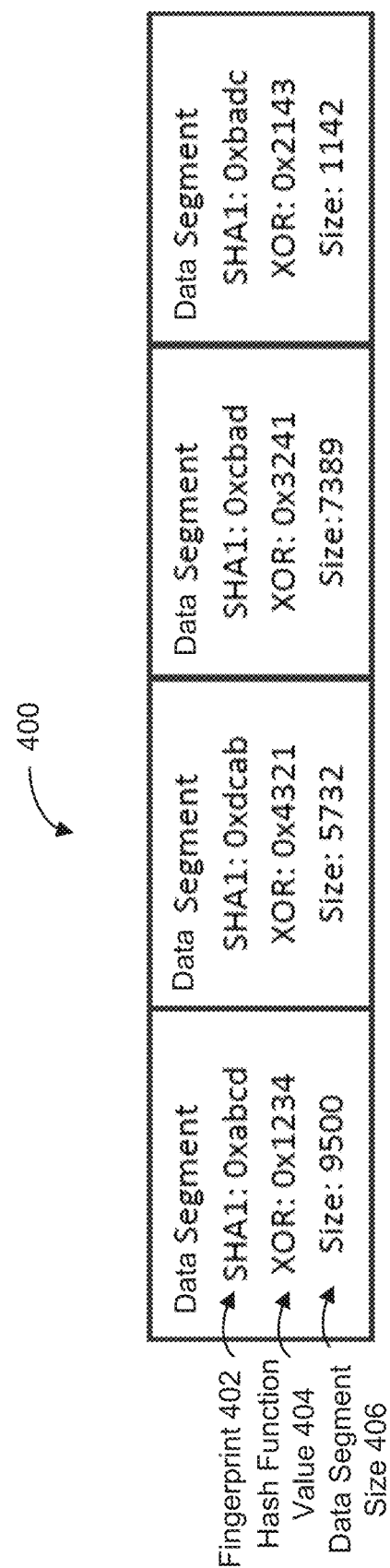
FIG. 4 is a block diagram illustrating metadata for a sequence of data segments for file copying according to one or more embodiments of the disclosure.

For examples of seg_refs, FIG. 4 depicts metadata 400 for a sequence of data segments which are a portion of a data file or data object that is being copied to the services orchestration environment 302. Each data segment is created in a content-defined manner with a data segment size that varies in a range, such as the range from 4 KB to 12 KB in Data Domain. Each data segment may be represented by metadata for a fingerprint 402, such as a 20-byte SHA-1 hash fingerprint, a hash function value 404, such as a 4-byte XOR value over the data segment, and the data segment size 406. The data segment size 406 is the least computationally expensive field to generate, followed by the 4-byte XOR hash function value 404, whereas the 20-byte SHA-1 hash fingerprint 402 is substantially more computationally expensive.

The Data Domain Boost client 332 can form data segments, generate the seg_refs, use the seg_refs to determine which groups of fingerprints form L1 segments, and determine the similarity group identifiers for the L1 segments on the client side. Then the Data Domain Boost client 332 can use the similarity group identifiers to route the L1 segments to the deduplication and compression services 312 and 314 which are responsible for processing L1 segments with the corresponding similarity group identifiers. Next, the responsible deduplication and compression services 312 and 314 perform deduplication, identify the newly received fingerprints that are unique, and communicate the identification of the unique fingerprints to the Data Domain Boost client 332, which identifies data segments that correspond to the unique fingerprints, compresses the identified unique data segments in the compression regions, and communicates the compression regions to the responsible deduplication and compression services 312 and 314 for storage to the underlying shared storage system 324.

Similarly, replication from a legacy Data Domain system is supported without new expensive computations. FIG. 3 depicts that a Data Domain system replicating 330 into a cluster, which would have the same communication paths as Data Domain Boost client 332, though the arrows illustrating the communication paths have been simplified. Data Domain replication has similarities to the functioning of the Data Domain Boost client. The Data Domain Boost system, or a module within the Data Domain Boost, can process replicated data from a Data Domain system to form L1 segments and then route the L1 segments to the deduplication and compression service 312 or 314 consistently with the main write path for the system 300. There are various Data Domain replication algorithms, but at the core, when writing data, the source Data Domain system communicates the seg_refs for the data segments across a network and receives back a communication of the identifiers of the unique data segments to compress and transfer.

When a source closes a file that is being copied to a destination, the data and metadata for the file need to be committed. Instead of forcing the writing of a small object to the shared storage systems 324 to process the commit, the source issues a commit on the stream of fingerprints associated with copying the file, verifies that all of the compression regions which have been sent are stored in the corresponding post-deduplication log 322, and verifies that necessary LP segments are stored either to the persistent log (L1s) or to the corresponding key values store 320 (upper LPs). The access object services 308 and 310 verify that all data has been committed with callbacks from other services, such as multiple deduplication and compression services 312 and 314, and then roll up the LP checksum for the file at the destination and compare this checksum with the LP checksum for the file at the source.

Copying a file from the services orchestration environment 302 to the services orchestration environment 338 has many of the same steps as the Data Domain Boost client 332 copying a file to the services orchestration environment 302. The main difference, compared to having a Data Domain Boost client 332 as the source, is that the services orchestration environment 302 source side is divided into services that may be on different physical nodes. First, the services orchestration environment 302 uses the file handle or other information for the file to be copied to determine which of the access object services 308 and 310 on the source side will receive a communication of the stream of fingerprints for the file's segments. Then the appropriate access object service 308 or 310 retrieves the LP tree for the file from the distributed key value store. After reading from the top of the LP tree to a L1 reference, the appropriate access object service 308 or 310 uses the corresponding similarity group identifier to determine which of the deduplication and compression services 312 or 314 to contact to request some of the file's fingerprints.

That contacted deduplication and compression service 312 or 314 reads the L1 segment corresponding to the similarity group identifier, which may be in a local key value store or object storage, extracts the group of fingerprints from the L1 segment, and communicates the group of fingerprints to the appropriate access object service 308 or 310. which communicates the group of fingerprints and the similarity group identifier to the destination services orchestration environment 338. Since the L1 segment and its similarity group identifier are already known and provided, they do not have to be determined by the destination services orchestration environment 338. When the destination services orchestration environment 338 identifies fingerprints missing in the destination, and then requests the file segments identified by these missing fingerprints, the appropriate access object service 308 or 310 receives a communication of the request for these file segments, and then uses the corresponding similarity group identifier to communicate this request to the appropriate deduplication and compression service 312 or 314. The appropriate deduplication and compression service 312 or 314 retrieves the requested segments from the shared storage system, 324, compresses the requested segments into compression regions, and communicates the compression regions to the appropriate access object service 308 or 310, which communicates the compression regions to the destination services orchestration environment 338, which stores the compression regions to the destination shared storage system 340 as part of copying the file from the source services orchestration environment 302.

Stream management does not change for the file copying. After starting the file copying, each time a stream is requested for an access object service instance to process, a value that represents the current capacity of streams that the services orchestration environment 302 can process at desired performance levels is decremented by one. Each time that an access object service instance finishes with its stream, the value is incremented by one. When the value is zero, no more streams will be accepted by an access object service instance, thereby functioning as a way to throttle the number of parallel files being copied.

Some protection already exists for many types of errors which can occur when copying a data file between clients, such as the Data Domain Boost client 332 and the Data Domain Boost client 334, including protection against many errors created by network outages, process failures, and data corruption during transfer. However, there are many additional types of errors that can occur when copying a data file to or from a services orchestration environment 302. A new complexity of the services orchestration environment 302 is that any individual instance of an access object service, a deduplication and compression service, or any other type of service which is processing a data file's segments and/or fingerprints may fail temporarily and then restart, potentially losing copying state.

The services orchestration environment 302 can handle such errors in the copying of data files by assigning a generation identifier, which is a monotonically increasing number that indicates when a service instance started executing, to each service instance and then tracking each service instance's generation number. Consequently, a generation identifier functions as a timestamp. When a service instance begins executing, the services orchestration environment 302 retrieves a generation identifier from a central location, such as a record in a distributed key value store, assigns the generation identifier to the service instance, and then increments the generation identifier in the distributed key value store, which is fault tolerant and maintains 2*f+1 generation identifiers for handling f failures. Hence, the services orchestration environment 302 will not lose these generation identifiers unless there is a failure of 2*f+1 service instances.

For example, the services orchestration environment 302 assigns the generation identifier of 10 to the access object service 308, a generation identifier of 11 to the deduplication and compression service 310, and a generation identifier of 12 to the deduplication and compression service 312. If the deduplication and compression service 310 with the generation identifier of 11 fails and restarts, the services orchestration environment 302 assigns the new generation identifier of 13 to the deduplication and compression service 310. If the deduplication and compression service 312 with the generation identifier of 12 fails and restarts, the services orchestration environment 302 assigns the new generation identifier of 14 to the deduplication and compression service 312.

Continuing the example, when copying a data file to a services orchestration environment 302, the source of the data file communicates with the access object service instance 308 and receive its generation identifier of 10. As copying of the data file is completing, the source communicates with the access object service 308 and queries its generation identifier again. If the currently queried value for the generation identifier of the access object service 308 matches the source's recorded value of 10 for the generation identifier of the access object service 308, then this match indicates that the access object service 308 continued running during the copying of the data file, such that the services orchestration environment 302 safely commits the data file's segments and fingerprints. If the currently queried value for the generation identifier of the access object service 308 does not match the source's recorded value of 10 for the generation identifier of the access object service 308, then this lack of a match indicates that the access object service 308 restarted during the copying of the data file, such that some the data file's segments and/or fingerprints may have been lost, and the services orchestration environment 302 follows an error recovery procedure.

Similarly, when the access object service 308 communicates a file's fingerprints to the deduplication and compression service 310 and the deduplication and compression service 312, the access object service 308 queries the deduplication and compression service 310 and the deduplication and compression service 312 for their generation identifiers of 11 and 12, respectively. As copying of the data file is completing, the access object service 308 communicates segments to the deduplication and compression service 310 and the deduplication and compression service 312, and queries the deduplication and compression service 310 and the deduplication and compression service 312 for their current generation identifiers. If the currently queried values for the generation identifiers of the deduplication and compression services 310 and 312 match the access object service 308's recorded values of 11 and 12 for the generation identifiers of the deduplication and compression services 310 and 312, then these matches indicate that the deduplication and compression services 310 and 312 continued running during the copying of the data file, such that the services orchestration environment 302 safely commits the data file's segments and fingerprints. However, either or both of the currently queried values for the generation identifiers of the deduplication and compression services 310 and 312 may not match the access object service 308's recorded values of 11 and 12 for the generation identifiers of the deduplication and compression services 310 and 312. In this situation, the deduplication and compression services 310 and/or 312 which lacks a match for its recorded generation identifier must have restarted during the copying of the data file, such that some of the data file's segments and/or fingerprints may have been lost, and the services orchestration environment 302 follows an error recovery procedure.

In terms of failure situations, the basic technique is to recognize a failure and restart the file copying process. If a source Data Domain Boost client 332 fails while copying a data file's segments and/or fingerprints to the services orchestration environment 302, then the copying of the data file restarts. If a destination access object service 308 or 310 fails while processing a data file's segments and/or fingerprints, then the copying of the data file restarts. If a destination deduplication and compression service 312 or 314 fails while processing a data file's segments and/or fingerprints, then the copying of the data file may be restarted, or an access object service 308 or 310 may have enough tracking state to continue processing the data file's segments and/or fingerprints based on the last time data was committed or the last amount of data that was committed.

Upon failure of copying a data file, a source access object service restarts the file copying from the beginning even if another source access object service takes over that file handle space for the data file for which copying failed. Upon failure of copying a data file, a source deduplication and compression service either restarts the copying process or another instance of a source deduplication and compression service can take over that range of similarity group identifiers which include the data file's similarity group identifier and continue to service the current state of the file copying without restarting the file copying process from the beginning of the data file copying process.

When an error in detected in the copying of a data file, some of the data file's segments and their corresponding fingerprints may have already copied correctly to the destination. Consequently, subsequently received fingerprints which correspond to those portions of the correctly copied segments will be detected as duplicates of the correctly copied segments' fingerprints, such that resending these data file's segments is not necessary. Furthermore, a garbage collection service may have removed any unreferenced segments from an incomplete copy of the data file. Therefore, if checkpoints are created for the file copying process, then the services orchestration environment 302 can use these checkpoints to continue the file copying process from the last checkpoint, without having to restart the file copying process from the beginning. The services orchestration environment 302 can create a checkpoint based on the amount of segments and fingerprints sent from the source of the data file to the destination of the data file, such as every 100 MB, or based on a time threshold, such as every 10 minutes.

For example, the services orchestration environment 302 restarts all communications for a copying file because the time when the deduplication and compression service 310 restarted and received the new generation identifier of 13 was less than 10 minutes after the copying of the file began and corresponds to checkpoint which was created after the number of fingerprints received from the source correspond to less than 100 MB of data segments. In an alternative example, the services orchestration environment 302 resends only the last segments to the deduplication and compression service 310 because the time when the deduplication and compression service 310 restarted and received the new generation identifier of 13 was immediately before the deduplication and compression service 310 received the communication of the last segments. This time was also hours after the copying of the file began and corresponds to a checkpoint which was created after the number of fingerprints received from the source correspond to more than 1,000 MB (1 TB), of data segments.

In a distributed computing environment, checkpointing is a technique that helps tolerate failures that otherwise would force long-running processes to restart from the beginning. The most basic way to implement checkpointing is to stop the process, copy all the required data from the memory to reliable storage, such as a parallel file system, and then continue with the process. In case of failure, when the process restarts, it does not need to start from the beginning. Rather, the process can read the latest state ("the checkpoint") from the stable storage and execute from that. In the coordinated checkpointing approach, processes must ensure that their checkpoints are consistent. This is usually achieved by some kind of two-phase commit protocol algorithm. In the uncoordinated checkpointing, each process checkpoints its own state independently.

After a number of transactions had been processed, a "snapshot" or "checkpoint" of the state of the process is taken. If the process fails before the next checkpoint, the process can restart by using the checkpoint information and the last place in the transaction file where a transaction had successfully completed. The process can then restart at that point.

Checkpointing tends to be expensive, so it is generally not done with every record, but at some reasonable compromise between the cost of a checkpoint against the value of the computer time needed to reprocess a batch of records. Thus, the number of records processed for each checkpoint might range from 25 to 200, depending on cost factors, the relative complexity of the process, and the resources needed to successfully restart the process.

Figure 5A:
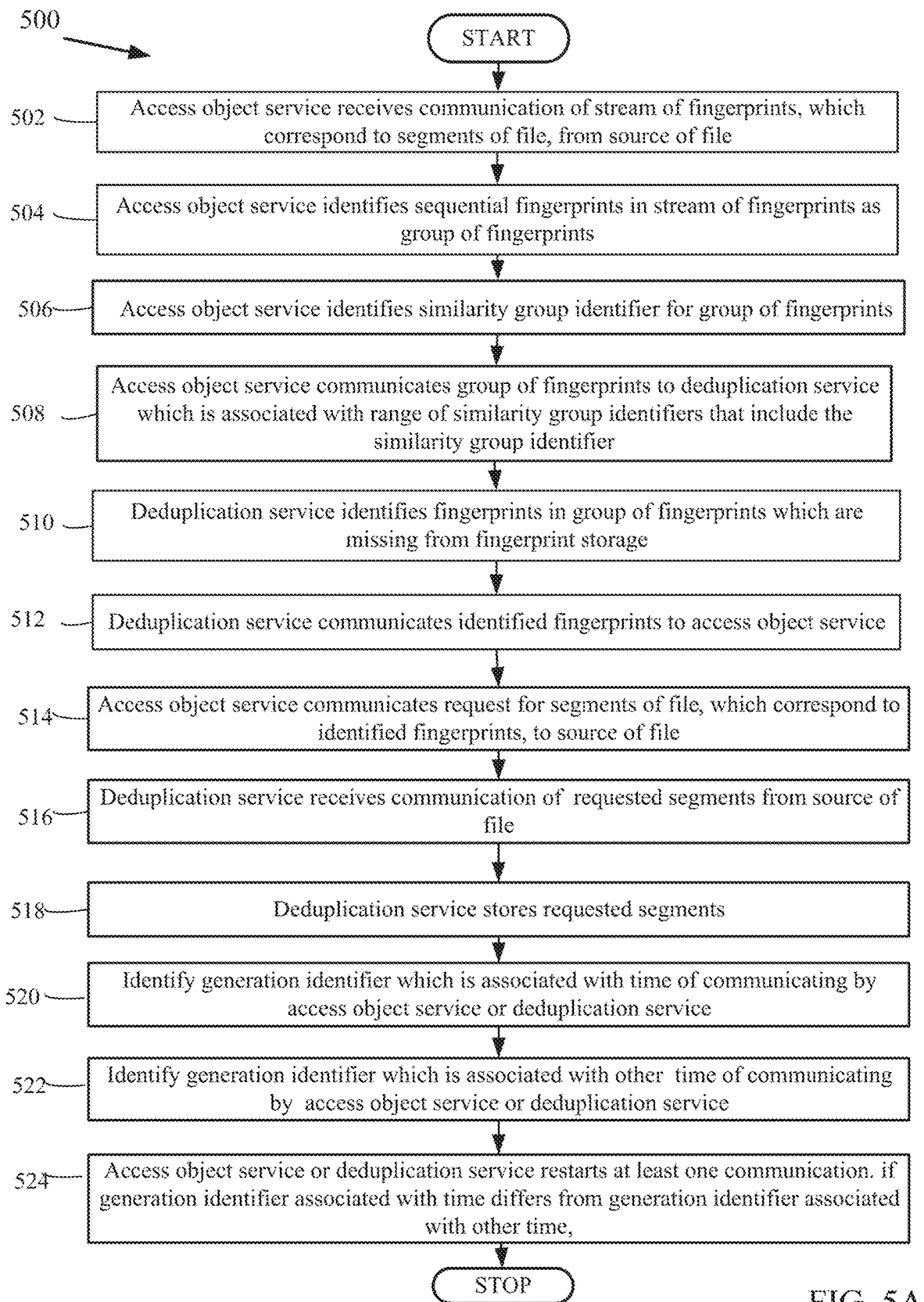
FIGS. 5A-C are block diagrams illustrating example methods for file copying according to one or more embodiments of the disclosure.
Figure 5B:
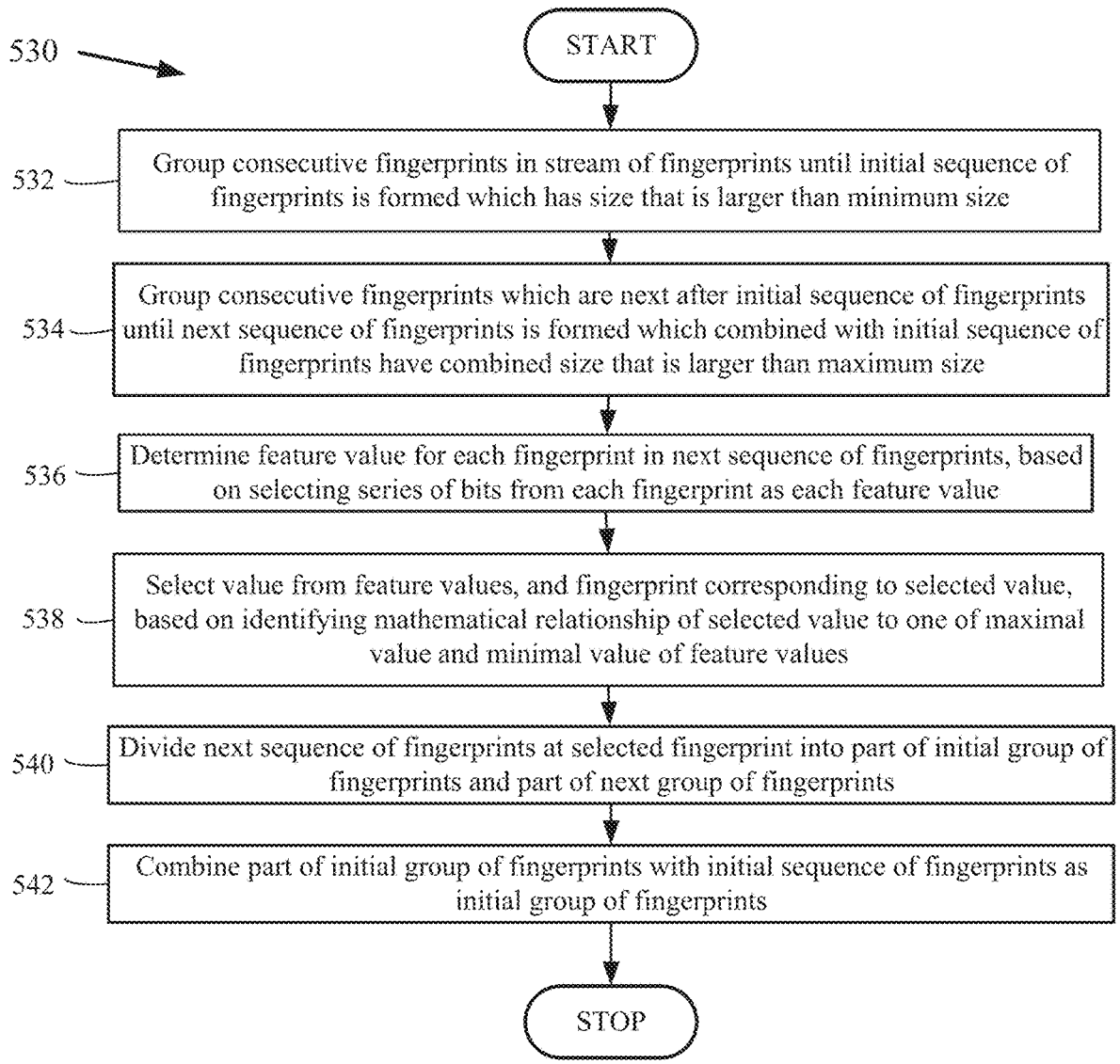
Figure 5C:
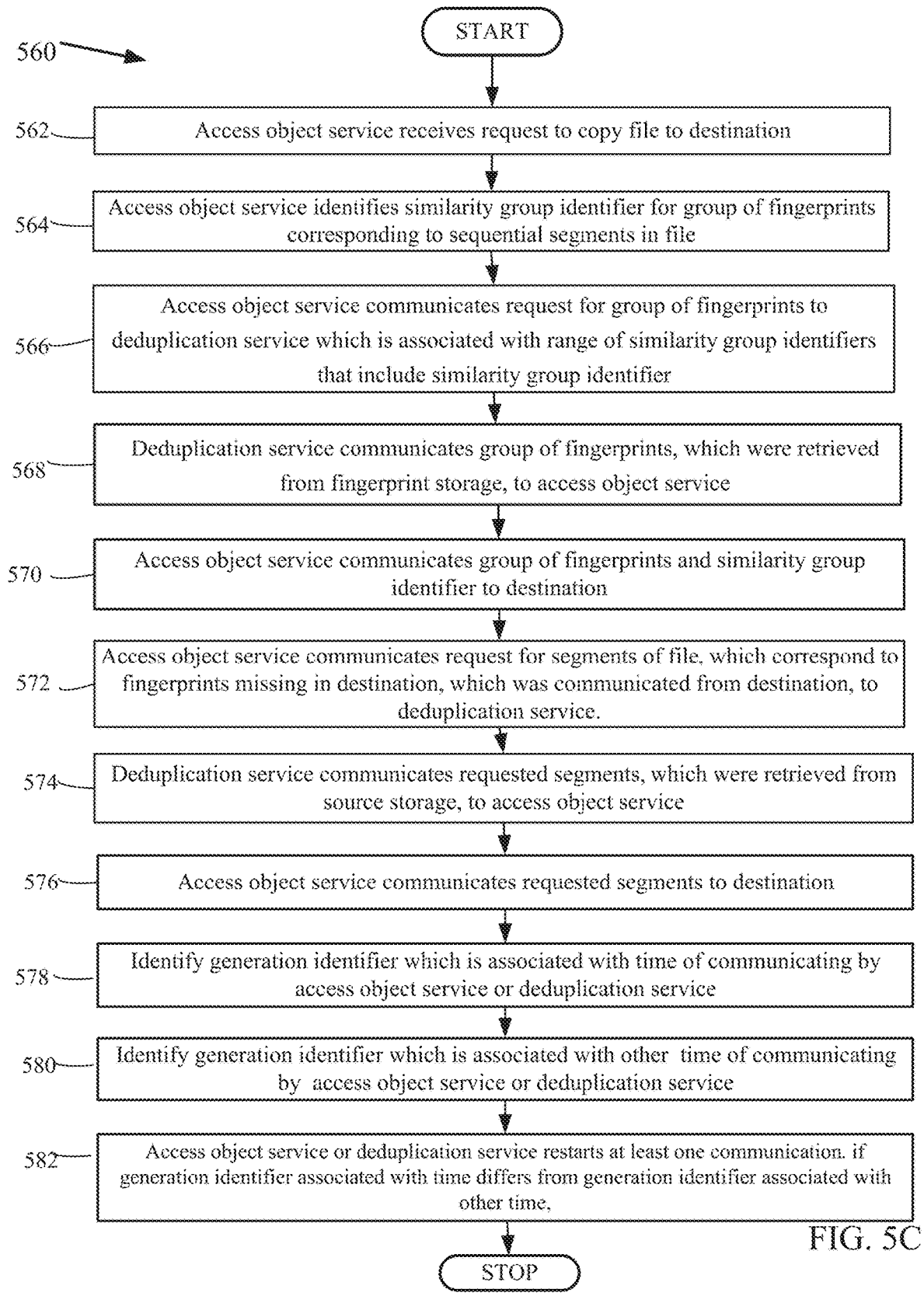

FIGS. 5A-C are flowcharts that illustrate methods for file copying under an embodiment. Flowchart 500 illustrates method acts illustrated as flowchart blocks for certain steps involved in the client system 102, the backup system 104, the backup server 106, the clustered storage system 108, and the services orchestration environment 110 of FIG. 1. FIG.

5A depicts the flowchart 500 as a method for destination file copying and error handling, with the method acts illustrated as flowchart blocks 502-524.

An access object service receives a communication of a stream of fingerprints, which correspond to segments of a file, from a source of the file, block 502. The system receives fingerprints for segments in a file that is to be copied from a source. For example, and without limitation, this can include the access object service 308 receiving a communication of a stream of 20-byte SHA-1 hash fingerprints for segments in a database file being currently copied from the Data Domain Boost Client 332 to the destination services orchestration environment 302.

A source can be an origin from where a file is received. A file can be a collection of data stored in a computer's memory or on a storage device under a single identifying name. A segment can be a part into which a file is divided. A stream of fingerprints can be a series of bit strings which were mapped from larger data objects or data files, and which uniquely identify the larger data objects or data files, which are made available over time. An access object service can be a component that provides functions for processing data structures used by computers.

A load balancer may use an identifier of a file to select which of the access object services will receive the communication of the stream of fingerprints for the file's segments. For example, the custom load balancer 306 hashes the name of the database file for which the incoming stream of fingerprints was generated, and then uses the resulting hash value to route the stream of fingerprints to the access object service 308, instead of to the access object service 310. A load balancer can be an entity that distributes a set of tasks over a set of resources, with the aim of making the overall processing of the tasks more efficient. An identifier can be a sequence of characters used to refer to an entity.

After receiving a communication of a stream of fingerprints, an access object service identifies sequential fingerprints in the stream of fingerprints as a group of fingerprints, block 504. The system identifies a group of fingerprints which will be processed together. By way of example and without limitation, this can include the access object service 308 identifying an existing group of fingerprints numbered 1 to 509 which the Data Domain Boost Client 332 has already created from the stream of fingerprints for the database file. In an alternative example, the access object service 308 executes the blocks 532-542, as depicted by FIG. 5B, to generate a group of fingerprints for the database file being copied from the client 334 to the services orchestration environment 302. Sequential fingerprints can be consecutive bit strings which were mapped from larger data objects or data files, and which uniquely identify the larger data objects or data files. Any group of fingerprints can be a collection of consecutive portions of bit strings which were mapped from larger data objects or data files, and which uniquely identify the larger data objects or data files.

Following the identification of a group of segments, an access object service identifies a similarity group identifier for the group of fingerprints, block 506. The system identifies a group identifier to consistently route groups of fingerprints which are similar to each other. In embodiments, this can include the access object service 308 identifying an existing similarity group identifier of 483, for the group of fingerprints numbered 1 to 509, which the Data Domain Boost Client 332 has already created for the group of fingerprints in the database file being copied from the Data Domain Boost Client 332 to the destination services orchestration environment 302. A similarity group identifier can be a specified number which refers to how much a group of data segments resembles other groups of data segments.

In an alternative example, the access object service 308 generates a similarity group identifier for the group of fingerprints in the database file being copied from the client 334 to the services orchestration environment 302. If the access object service 308 executes the blocks 532-542, during the grouping of consecutive fingerprints as the next sequence of fingerprints, or after the selecting of a value from the feature values and a fingerprint corresponding to the selected value, an additional feature value may be determined for at least one fingerprint in the next sequence of fingerprints, by selecting a series of bits from the fingerprints, wherein the selected series of bits is mutually exclusive of any series of bits selected for the feature values. The system can determine additional feature values for fingerprints in the group, based on the value of specific bytes for fingerprints in the specified subsection of fingerprints for forming the current L1 segment. For example, the access object service 308 identifies the value of 4.147483 billion for the bytes 4 to 7 of the 20-byte SHA-1 hash fingerprint for the selected data fingerprint 509. In another example, the access object service 308 identifies the value of 4.283269 billion as the second highest value of bytes 8 to 11 of the 20-byte SHA-1 hash fingerprints for these next 500 fingerprints, so that the second highest value of 4.283269 billion may be used as the basis for determining a similarity group identifier. Any feature value can be a numerical amount of an attribute of something. A series of bits can be a sequence of binary digits.

Having determined at least one additional feature value, a similarity group identifier may be determined based on one of the at least one additional feature value, which may include identifying a mathematical relationship of the one of the at least one additional feature values to a maximal value or a minimal value of the at least one additional feature value. The system can determine a similarity group identifier for routing the current L1 segment to a deduplication and compression service, and the similarity group identifier may be based on the maximal (or minimal) value of specific bytes of each fingerprint in the specified subsection of fingerprints for forming the current L1 segment. For example, the access object service 308 determines an unscaled similarity group identifier of 4.147483 billion for the bytes 4 to 7 of the SHA-1 hash fingerprint for the selected fingerprint number 509. In an alternative example, the access object service 308 determines an unscaled similarity group identifier of 4.283269 billion for the fingerprint number 505 because the data segment number 505 has the second highest value of the bytes 8 to 11 of each 20-byte SHA-1 hash fingerprint for the data segments numbered 251 to 750.

A mathematical relationship can be how values are associated on a numerical basis. A maximal value can be the largest numerical amount of an attribute of some things within a specific range of things. A minimal value can be the smallest numerical amount of an attribute of some things within a specific range of things.

Since a similarity group identifier may be determined based on the values of 4 selected bytes, which form the alternative feature values, and which range from 0 to 4.294 billion, an access object service 308 or 310 can transform the selected alternative feature value's range of values to fall in the range of zero up to the highest number of similarity groups supported, such as 1,000. For example, the access object service 308 applies a mod operator (such as the remainder after a value is divided by 1,000) to transform the selected alternative feature value to a similarity group identifier's value, such as the remainder of 483 after 4.147483 billion is divided by 1,000, or the remainder of 269 after 4.283269 billion is divided by 1,000.

After identifying a group of fingerprints and a similarity group identifier for the group of fingerprints, an access object service communicates the group of fingerprints to a deduplication service which is associated with a range of similarity group identifiers that include the similarity group identifier, block 508. The system uses a similarity group identifier to communicate a group of fingerprints to a deduplication and compression service that processes similar groups of fingerprints. For example, and without limitation, this can include the access object service 308 using the similarity group identifier of 483 to route the group of fingerprints numbered 1 to 509 as the current L1 segment to be deduplicated by the deduplication and compression service 312, which deduplicates L1 segments with similarity group identifiers in the range of 0 to 500. In an alternative example, the access object service 308 uses the similarity group identifier of 269 to route the group of fingerprints numbered 1 to 509 as the current L1 segment, to be deduplicated by the deduplication and compression service 312, which deduplicates L1 segments with similarity group identifiers in the range of 0 to 500. A deduplication service can be a component that provides functions for the elimination of redundant information. A range of similarity group identifiers can be a set of numbers between lower and upper limits of a scale which refers to how much groups of data segments resemble other groups of data segments.

Following receipt of a group of fingerprints which might be already stored in a fingerprint storage, a deduplication service identifies fingerprints in the group of fingerprints which are missing from the fingerprint storage, block 510. The system identifies the newly received fingerprints which were not previously received, and therefore correspond to new segments in the file which is being copied. By way of example and without limitation, this can include the deduplication and compression service 312 identifying fingerprints numbered 2-7, 11-13, and 17-19, from the group of fingerprints numbered 1 to 509, as fingerprints which are missing from the local fingerprint index 318. A fingerprint can be a bit string which was mapped from a larger data object or data file, and which uniquely identifies the larger data object or data file. A fingerprint storage can be recording media that retains bit strings which were mapped from larger data files, and which uniquely identify the larger data files.

Having identified newly received fingerprints which were not previously received, a deduplication service communicates the identified fingerprints to an access object service, block 512. The system uses the identification of any missing fingerprints to request their file segments, which evidently have not been received before. In embodiments, this can include the deduplication and compression service 312 communicating the fingerprints numbered 2-7, 11-13, and 17-19 to the access object service 308.

After receiving the communication of the identification of missing fingerprints, an access object service communicates a request for file segments, which correspond to the identified fingerprints, to the source of the file, block 514. The system requests the source of a file to provide the segments corresponding to the missing fingerprints. For example, and without limitation, this can include the access object service 308 requesting file segments numbered 2-7, 11-13, and 17-19, which correspond to the missing fingerprints numbered 2-7, 11-13, and 17-19, from the Data Domain Boost Client 332. A request can be an instruction to a computer to provide information or perform another function.

After requesting a source to provide file segments corresponding to missing fingerprints, a deduplication service receives a communication of the requested segments from the source of the file, block 516. The system receives the file segments corresponding to the fingerprints which were not received before. By way of example and without limitation, this can include the deduplication and compression service 312 receiving a communication of the file segments numbered 2-7, 11-13, and 17-19, compressed into compression regions, from the access object service 308, which received a communication of the file segments numbered 2-7, 11-13, and 17-19 compressed into compression regions from the Data Domain Boost Client 332. When received, a communication of the requested file segments may be in a compressed format, which can be a designed structure for the storage of data which is reduced relative to its original size.

Following receipt of requested segments from the source, a deduplication service stores the requested segments, block 518. The system stores the requested segments locally, which evidently have not been previously stored locally. In embodiments, this can include the deduplication and compression service 312 storing the missing fingerprints in the fingerprint index 318, and also storing the file segments numbered 2-7, 11-13, and 17-19 compressed into compression regions in the post-deduplication log 322. Then the packer service 316 reviews the post-deduplication log 322 for recently received compression regions, packs recently received compression regions which include the file segments numbered 2-7, 11-13, and 17-19 into a container, such as the large object 326, and then stores the large object 326 to a destination storage, such as the underlying shared storage system 324.

A packer service can be a component that provides functions for storing a collection of objects. A container can be a data structure that is a collection of objects. A destination storage can be recording media which retains digital information and is associated with where a file is sent.

During communications involving an access object service and a deduplication services, a generation identifier is identified which is associated with a first time of communicating by the access object service or the deduplication service, block 520. The system records the generation identifiers during the preliminary communications by instances of services. For example, and without limitation, this can include the access object service 308 recording the generation identifier of 12 for the deduplication and compression service 312 when communicating the group of fingerprints numbered 1 to 509 to the deduplication and compression service 312. In another example, the access object service 308 records the generation identifier of 11 for the deduplication and compression service 310 when communicating as additional group of fingerprints to the deduplication and compression service 310. A generation identifier can be a sequence of characters used to refer to an entity in a sequence. A time can be a clearly identified chronological point as measured in hours and minutes, such as past midnight or noon.

After recording the generation identifiers during the preliminary communications by instances of services, a generation identifier is identified which is associated with a second time of communicating by the access object service or the deduplication service, block 522. The system records the generation identifiers during the subsequent communications by instances of services. By way of example and without limitation, this can include the access object service 308 recording the generation identifier of 12 for the deduplication and compression service 312 when communicating the file segments numbered 2-7, 11-13, and 17-19, compressed into compression regions, to the deduplication and compression service 312. In another example, the access object service 308 records the generation identifier of 13 for the deduplication and compression service 310 when communicating additional file segments, compressed into compression regions, to the deduplication and compression service 310. In an alternative example, the access object service 308 records the generation identifier of 14 for the deduplication and compression service 312 when communicating the file segments numbered 2-7, 11-13, and 17-19, compressed into compression regions, to the deduplication and compression service 312.

If the generation identifier associated with the first time differs from the generation identifier associated with the second time, the access object service or the deduplication service restarts at least one communication, block 524. The system restarts at least part of the file copying process for service instances which changed their generation identifier during the process of copying a file. In embodiments, this can include the access object service 308 determining that the deduplication and compression service 312 continued running during the copying of the data file because the generation identifier of 12 for the deduplication and compression service 312 remained unchanged from the first to the last communication with the deduplication and compression service 312. Therefore, the services orchestration environment 302 safely commits the data file's segments and fingerprints. A communication can be a conveying of information.

In an alternative example, the access object service 308 determines that the deduplication and compression service 310 restarted during the copying of the data file because the generation identifier of 11 for the deduplication and compression service 310 changed to 13 from the first to the last communication with the deduplication and compression service 310. In another alternative example, the access object service 308 determines that the deduplication and compression service 312 restarted during the copying of the data file because the generation identifier of 12 for the deduplication and compression service 312 changed to 14 from the first to the last communication with the deduplication and compression service 312. Since a restart occurred during the copying of the data file in both alternative examples, some the data file's segments and/or fingerprints may have been lost, such that the services orchestration environment 302 follows an error recovery procedure to restart at least one communication.

Restarting at least one communication may be based on at least one checkpoint associated with at least one of a time of copying the file and an amount of the file copied, wherein communicating includes receiving a communication. For example, the services orchestration environment 302 restarts all communications for the copying file because the time when the deduplication and compression service 310 restarted and received the new generation identifier of 13 was less than 10 minutes after the copying of the file began and corresponds to checkpoint which was created after the number of fingerprints received from the source correspond to less than 100 MB of data segments. In an alternative example, the services orchestration environment 302 resends only the last segments to the deduplication and compression service 310 because the time when the deduplication and compression service 310 restarted and received the new generation identifier of 13 was immediately before the deduplication and compression service 310 received the communication of the last segments. This time was also hours after the copying of the file began and corresponds to a checkpoint which was created after the number of fingerprints received from the source correspond to more than 1,000 MB (1 TB), of data segments. A checkpoint can be snapshot of a procedure's state, so that procedures can restart from that point in case of a failure. An amount can be a quantity of something, especially the total of a thing in number, size, or extent.

Although FIG. 5A depicts the blocks 502-524 occurring in a specific order, the blocks 502-524 may occur in other orders. In other implementations, each of the blocks 502-524 may also be executed concurrently and/or in combination with other blocks and/or some blocks may be divided into a different set of blocks.

FIG. 5B is a flowchart 530 that illustrates a method for grouping fingerprints in a file that is being copied from a source to a destination, which enables generating a similarity group identifier for the group of fingerprints, with the method acts illustrated as flowchart blocks 532-542. During communication of a stream of fingerprints, sequential fingerprints associated with the stream of fingerprints are grouped until an initial sequence of fingerprints is formed which has a size that is larger than a minimum size, block 532. The system ensures that the aggregated size of the fingerprints which have been identified for a data object or data file meets the minimum size of a group of fingerprints for forming a L1 segment. For example, and without limitation, this can include the access object service 308 grouping the initial 250 fingerprints for 250 data segments of the copy of the database as the initial sequence of fingerprints for the current L1 segment because the size of the corresponding initial 250 data segments is 2 MB, which is the minimum size of a group of data segments for forming a L1 segment.

Consecutive fingerprints can be sequential bit strings which were mapped from larger data objects or data files, and which uniquely identify the larger data objects or data files. Any sequence of fingerprints can be consecutive portions of bit strings which were mapped from larger data objects or data files, and which uniquely identify the larger data objects or data files. A size can be a storage space magnitude. A minimum size can be a smallest storage space magnitude for a specific purpose.

Having identified an initial sequence of fingerprints, sequential fingerprints which are next after the initial sequence of fingerprints are grouped until a next sequence of fingerprints is formed which combined with the initial sequence of fingerprints have a combined size that is larger than a maximum size, block 534. The system groups a data file or object's fingerprints until the combined size of the grouped fingerprints is larger than the maximum size for a group of fingerprints for forming a L1 segment. By way of example and without limitation, this can include the access object service 308 grouping the next 500 fingerprints which follow the initial 250 fingerprints in the copy of the database as the next sequence of 500 fingerprints for forming the current L1 segment, because the size of the corresponding 750 data segments is 6 MB, which is the maximum size for a group of data segments for forming a L1 segment. A combined size can be a collection of storage space magnitudes. A maximum size can be a largest storage space magnitude for a specific purpose.

While grouping consecutive fingerprints as the next sequence of fingerprints, a feature value is determined for each fingerprint of the next sequence of fingerprints, block

536. The system determines a feature value for each fingerprint in the next sequence of fingerprints by selecting a series of bits from each fingerprint as each feature value. In embodiments, this can include the access object service 308 identifying bytes 8 to 11 of the 20-byte SHA-1 hash fingerprints which the access object service 308 has already generated for these next 500 data segments. A value can be a numerical amount.

After the determination of a feature value for each fingerprint of the next sequence of fingerprints, a value is selected from the feature values, and a fingerprint is selected corresponding to the selected value, block 538. The system identifies the fingerprint that will be used to divide the sequence of fingerprints which form the current L1 segment from the sequence of fingerprints which form the subsequent L1 segment, which may be identified based on the maximal or minimal value of specific bytes of the 20-byte SHA-1 hash fingerprints. For example, and without limitation, this can include the access object service 308 selecting the maximal value of 4.289 billion from the bytes 8-11 of the 20-byte SHA-1 hash fingerprints for the fingerprints numbered 251 to 750, and then selecting the fingerprint number 509 which has the maximal value 4.289 billion for the bytes 8-11 of its 20-byte SHA-1 hash fingerprint. A selected value can be a chosen numerical amount of an attribute of something.

Following selection of a fingerprint, the next sequence of fingerprints is divided at the selected fingerprint, which includes divisions into a part of an initial group of fingerprints and a part of a next group of fingerprints, block 540. The system divides the fingerprints for forming the current L1 segment from the fingerprints for forming the subsequent L1 segment at the fingerprint which has the relative maximal (or minimal) value of specific bytes of its 20-byte SHA-1 hash fingerprint. By way of example and without limitation, this can include the access object service 308 dividing the next 500 fingerprints, which are numbered 251 to 750, at the fingerprint number 509, which results in the fingerprints numbered 251 to 509 being the ending part of the current L1 segment and the fingerprints numbered 510 to 750 being the beginning part of the fingerprints for forming the next L1 segment. A part can be a piece of something which combined with other pieces makes up the whole.

Having divided the next sequence of fingerprints to form a part of the initial group of fingerprints, the part of the initial group of fingerprints is combined with the initial sequence of fingerprints as the initial group of fingerprints, block 542. The system combines the ending and beginning parts of the initial group of fingerprints. In embodiments, this can include the access object service 308 combining the fingerprints numbered 1 to 250 with the fingerprints numbered 251 to 509, which results in the fingerprints numbered 1 to 509 being the fingerprints for forming the current L1 segment.

The access object service 308 can apply a mod operator to transform the selected alternative feature value to a similarity group identifier's value, such as the remainder of 483 after 4.147483 billion is divided by 1,000, or the remainder of 269 after 4.283269 billion is divided by 1,000. Then the method depicted by flowchart 530 may return to the block 504 of FIG. 5A which may have initiated execution of the blocks 532-542.

FIG. 5C is a flowchart 560 that illustrates a method for source file copying and error handling, with the method acts illustrated as flowchart blocks 562-582. A request is received to copy a file to a destination, block 562. The system is the source of a file to be copied. For example, and without limitation, this can include the access object service 308 receiving a request to copy a database file from the source services orchestration environment 302 to the destination services orchestration environment 338. A destination can be a target for where a file is sent.

A load balancer may use an identifier of a file to select which of the access object services will identify a similarity group identifier for a group of fingerprints which were created for a file that is requested to be copied to a destination. For example, the custom load balancer 306 hashes the name of the database file that is requested to be copied to the destination services orchestration environment 338, and then uses the resulting hash value to route the request to the access object service 308, instead of to the access object service 310.

After receiving a request to copy a file to a destination, an access object service identifies a similarity group identifier for a group of fingerprints corresponding to sequential segments in the file that was requested to be copied, block 564. The system identifies an existing similarity group identifier for an existing group of fingerprints for the file requested to be copied. By way of example and without limitation, this can include the access object service 308 using the name of the file requested to be copied and the named file's metadata to identify an existing similarity group identifier of 483 which the Data Domain Boost Client 332 or the services orchestration environment 302 had already created for a group of fingerprints numbered 1 to 509 in the database file requested to be copied. The existing similarity group identifier and the existing group of fingerprints may have been created either before or when the database file was copied to the services orchestration environment 302.

The Data Domain Boost Client 332 or the services orchestration environment 302 can execute the blocks 532-542, as described above and depicted by FIG. 5B, to generate a group of fingerprints for the database file to be copied from the source services orchestration environment 302 to the destination services orchestration environment 338. The Data Domain Boost Client 332 or the services orchestration environment 302 can also execute the block 506, as described above and depicted by FIG. 5A, to generate a similarity group identifier for the group of fingerprints. Sequential segments can be consecutive parts into which a file is divided.

Following the identification of a similarity group identifier for a group of fingerprints an access object service communicates a request for the group of fingerprints to a deduplication service which is associated with a range of similarity group identifiers that include the similarity group identifier, block 566. The system requests the appropriate service to provide the group of fingerprints. In embodiments, this can include the access object service 308 using the similarity group identifier of 483 to request the fingerprints for the group of fingerprints numbered 1 to 509 from the deduplication and compression service 312, which supports groups of segments with similarity group identifiers in the range of 0 to 500.

Having retrieved the requested group of fingerprints from fingerprint storage, a deduplication service communicates the group of fingerprints to an access object service, block 568. The system retrieves a group of fingerprints for the file to be copied to the destination. For example, and without limitation, this can include the deduplication and compression service 312 retrieving the group of fingerprints numbered 1 to 509 from the underlying shared storage system 324, and then communicating the group of fingerprints numbered 1 to 509 to the access object service 308.

After receiving a communication of the requested group of fingerprints, an access object service communicates the group of fingerprints and its similarity group identifier to a destination, block 570. The system communicates a group of fingerprints for the file being copied to the destination, along with a similarity group identifier to enable the destination to efficiently process the group of the fingerprints. By way of example and without limitation, this can include the access object service 308 communicating the group of fingerprints numbered 1 to 509 and the similarity group identifier of 483 to the destination services orchestration environment 338.

Following receipt from a destination of a request for segments of the file, which correspond to fingerprints missing in the destination, an access object service communicates the request to a deduplication service, block 572. The system forwards the request for segments missing from the destination to the service which can retrieve the missing segments. In embodiments, this can include the access object service 308 receiving a communication of a request from the destination services orchestration environment 338 for file segments numbered 2-7, 11-13, and 17-19 because fingerprints numbered 2-7, 11-13, and 17-19 are missing in the destination services orchestration environment 338, and then communicating the request to the deduplication and compression service 312.

Having retrieved the requested segments from a source storage, a deduplication service communicates the requested segments to an access object service, block 574. The system retrieves, compresses, and communicates file segments which were identified as missing from the destination. For example, and without limitation, this can include the deduplication and compression service 312 retrieving the requested file segments numbered 2-7, 11-13, and 17-19 from the underlying shared storage system 324, compressing these requested file segments into compression regions, and communicating these compression regions to the access object service 308. A source storage can be recording media which retains digital information and is associated with from where a file originates.

Following receipt of requested segments, the access object service communicates the requested segments to the destination, block 576. The system communicates file segments, which were identified as missing from the destination, to the destination. By way of example and without limitation, this can include the access object service 308 communicating the compression regions which include the file segments numbered 2-7, 11-13, and 17-19 to the destination services orchestration environment 338, which records the requested segments into a log, uses a packer service to form a container that includes the requested segments, and then stores the container into a destination storage, such as the destination shared storage system 340. A log can be recording media that retains digital information.

During communications involving an access object service and a deduplication services, a generation identifier is identified which is associated with a first time of communicating by the access object service or the deduplication service, block 578. The system records the generation identifiers during the preliminary communications by instances of services. In embodiments, this can include the access object service 308 recording the generation identifier of 12 for the deduplication and compression service 312 when requesting the group of fingerprints numbered 1 to 509 from the deduplication and compression service 312. In another example, the access object service 308 records the generation identifier of 11 for the deduplication and compression service 310 when requesting an additional group of fingerprints from the deduplication and compression service 310.

After recording the generation identifiers during the preliminary communications by instances of services, a generation identifier is identified which is associated with a second time of communicating by the access object service or the deduplication service, block 580. The system records the generation identifiers during the subsequent communications by instances of services. For example, and without limitation, this can include the access object service 308 recording the generation identifier of 12 for the deduplication and compression service 312 when receiving s communication of the file segments numbered 2-7, 11-13, and 17-19, compressed into compression regions, from the deduplication and compression service 312. In another example, the access object service 308 records the generation identifier of 13 for the deduplication and compression service 310 when receiving a communication of additional file segments, compressed into compression regions, from the deduplication and compression service 310. In an alternative example, the access object service 308 records the generation identifier of 14 for the deduplication and compression service 312 when receiving a communication of the file segments numbered 2-7, 11-13, and 17-19, compressed into compression regions, from the deduplication and compression service 312.

If the generation identifier associated with the first time differs from the generation identifier associated with the second time, the access object service or the deduplication service restarts at least one communication, block 582. The system restarts at least part of the file copying process for service instances which changed their generation identifier during the process of copying a file. By way of example and without limitation, this can include the access object service 308 determining that the deduplication and compression service 312 continued running during the copying of the data file because the generation identifier of 12 for the deduplication and compression service 312 remained unchanged from the first to the last communication with the deduplication and compression service 312. Therefore, the services orchestration environment 302 safely commits the record of copying the data file to the destination.

In an alternative example, the access object service 308 determines that the deduplication and compression service 310 restarted during the copying of the data file because the generation identifier of 11 for the deduplication and compression service 310 changed to 13 from the first to the last communication with the deduplication and compression service 310. In another alternative example, the access object service 308 determines that the deduplication and compression service 312 restarted during the copying of the data file because the generation identifier of 12 for the deduplication and compression service 313 changed to 14 from the first to the last communication with the deduplication and compression service 312. Since a restart occurred during both alternative examples of the copying of the data file, some the data file's segments and/or fingerprints may have been lost, such that the services orchestration environment 302 follows an error recovery procedure to restart at least one communication.

Restarting at least one communication may be based on at least one checkpoint associated with at least one of a time of copying the file and an amount of the file copied, wherein communicating includes receiving a communication. For example, the services orchestration environment 302 restarts all communications for the copying of the file because the time when the deduplication and compression service 310 restarted and received the new generation identifier of 13 was less than 10 minutes after the copying of the file began and corresponds to checkpoint which was created after the number of fingerprints sent to the destination correspond to less than 100 MB of data segments. In an alternative example, the services orchestration environment 302 resends only the last segments from the deduplication and compression service 310 because the time when the deduplication and compression service 310 restarted and received the new generation identifier of 13 was immediately before the deduplication and compression service 310 sent the last segments. This time was also hours after the copying of the file began and corresponds to checkpoint which was created after the number of fingerprints sent to the destination correspond to more than 1,000 MB (1 TB), of data segments.

Although FIG. 5C depicts the blocks 562-582 occurring in a specific order, the blocks 562-582 may occur in other orders. In other implementations, each of the blocks 562-582 may also be executed concurrently and/or in combination with other blocks and/or some blocks may be divided into a different set of blocks.

Exemplary Computing System

Figure 6:
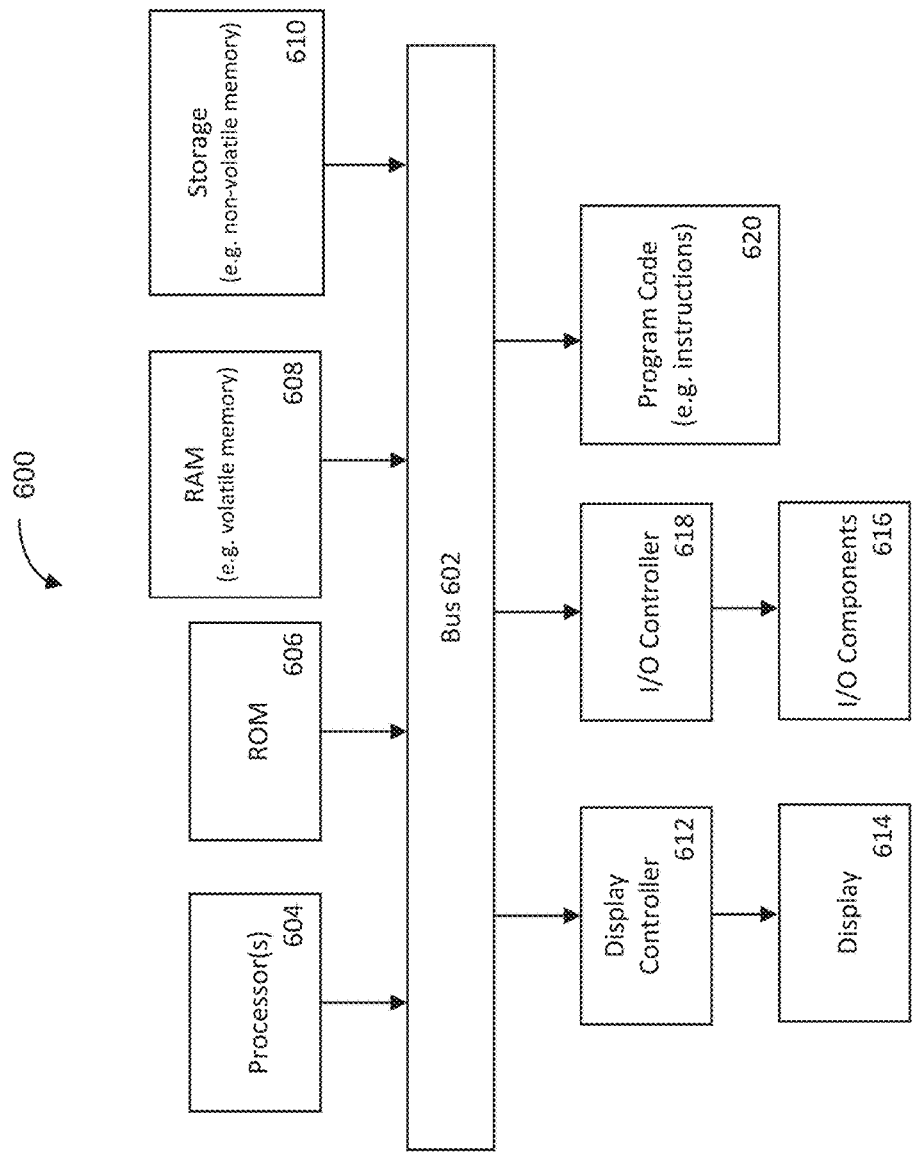
FIG. 6 is a block diagram illustrating a computing system for file copying according to one or more embodiments of the disclosure.

FIG. 6 shows a block diagram of an example of a computing system that may be used in conjunction with one or more embodiments of the disclosure. For example, computing system 600 (or system, or server, or computing device, or device) may represent any of the devices or systems described herein that perform any of the processes, operations, or methods of the disclosure. Note that while the computing system 600 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 600 may include a bus 602 which may be coupled to a processor 604, ROM (Read Only Memory) 606, RAM (or volatile memory) 608, and storage (or non-volatile memory) 610. The processor(s) 604 may retrieve stored instructions from one or more of the memories 606, 608, and 610 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein.

As referred to herein, for example, with reference to the claims, a processor may include one or more processors. Moreover, the one or more processors 604 may perform operations in an on-demand or "cloud computing" environment or as a service, such as within a "software as a service" (SaaS) implementation. Accordingly, the performance of operations may be distributed among the one or more processors 604, whether residing only within a single machine or deployed across a number of machines. For example, the one or more processors 604 may be located in a single geographic location (such as within a home environment, an office environment, or a server farm), or may be distributed across a number of geographic locations.

The RAM 608 may be implemented as, for example, dynamic RAM (DRAM), or other types of memory that require power continually in order to refresh or maintain the data in the memory. Storage 610 may include, for example, magnetic, semiconductor, tape, optical, removable, non-removable, and other types of storage that maintain data even after power is removed from the system. It should be appreciated that storage 610 may be remote from the system, such as accessible via a network.

A display controller 612 may be coupled to the bus 602 in order to receive display data to be displayed on a display device 614, which can display any one of the user interface features or embodiments described herein and may be a local or a remote display device. The computing system 600 may also include one or more input/output (I/O) components 616 including mice, keyboards, touch screen, network interfaces, printers, speakers, and other devices. Typically, the input/output components 616 are coupled to the system through an input/output controller 618.

Program code 620 may represent any of the instructions, applications, software, libraries, toolkits, modules, components, engines, units, functions, logic, etc. as described herein. Program code 620 may reside, completely or at least partially, within the memories described herein (such as non-transitory computer-readable media), or within a processor during execution thereof by the computing system. Program code 620 may include both machine code, such as produced by a compiler, and files containing higher-level or intermediate code that may be executed by a computing system or other data processing apparatus (or machine) using an interpreter. In addition, program code 620 may be implemented as software, firmware, or functional circuitry within the computing system, or as combinations thereof. Program code 620 may also be downloaded, in whole or in part, through the use of a software development kit or toolkit that enables the creation and implementation of the described embodiments.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein.

It should be noted that references to ordinal numbers such as "first," "second," "third," etc., may indicate an adjective for an element (such as any noun in the application). The use of ordinal numbers does not necessarily imply or create any particular ordering of the elements nor limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

In addition, the use of the term "or" indicates an inclusive or (such as "and/or") unless otherwise specified. For example, the phrase "at least one of x, y, or z" means any one of x, y, and z, as well as any combination thereof. In addition, the term "based on" is used to describe one or more factors that affect a determination.

These terms do not foreclose additional factors that may affect a determination. For example, the phrase "determining A based on B" includes B being a factor that affects the determination of A, and does not foreclose the determination of A from also being based on C. However, in other instances, A may be determined based solely on B, such as by the use of the terms "only," "solely," and other such terminology. In addition, the term "approximately" or "substantially" may be used herein and may be interpreted as "as nearly as practicable," "within technical limitations," and the like.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. A system for source file copying and error handling comprising:
   one or more processors; and
      a non-transitory computer readable medium storing a plurality of instructions, which when executed, cause the one or more processors to:
      identify, by an access object service, in response to receiving a request to copy a file to a destination, a similarity group identifier for a group of fingerprints corresponding to sequential segments in the file;
      communicate, by the access object service, a request for the group of fingerprints to a deduplication service associated with a range of similarity group identifiers that include the similarity group identifier;
      communicate, by the deduplication service, to the access object service, the group of fingerprints retrieved from fingerprint storage;
      communicate, by the access object service, the group of fingerprints and the similarity group identifier to the destination;
      communicate to the deduplication service by the access object service, a request communicated from the destination for segments of the file corresponding to fingerprints missing from the destination;
      communicate to the access object service by the deduplication service, the requested segments retrieved from a source storage;
      communicate, by the access object service, the requested segments to the destination;
      identify, by one of the access object service and the deduplication service, a generation identifier at a first time of communicating;
      identify, by the one of the access object service and the deduplication service, a generation identifier at a second time of communicating; and
      restart at least one communication by the one of the access object service and the deduplication service, in response to a determination that the generation identifiers at the first and second times differ.

2. The system of claim 1, wherein restarting at least one communication is based on at least one checkpoint associated with at least one of a time of copying the file and an amount of the file copied, wherein communicating includes receiving a communication.

3. The system of claim 1, wherein the access object service identifying the similarity group identifier for the group of fingerprints comprises a load balancer using an identifier of the file to select the access object service, from a plurality of access object services, for identifying the similarity group identifier for the group of fingerprints.

4. The system of claim 1, wherein the group of fingerprints comprises sequential fingerprints in a stream of fingerprints, and is identified by:
   grouping consecutive fingerprints in the stream of fingerprints until an initial sequence of fingerprints is formed which has a size that is larger than a minimum size;
   grouping consecutive fingerprints which are next after the initial sequence of fingerprints until a next sequence of fingerprints is formed which combined with the initial sequence of fingerprints have a combined size that is larger than a maximum size;
   determining a feature value for each fingerprint in the next sequence of fingerprints, based on selecting a series of bits from each fingerprint as each feature value;
   selecting a value from the feature values, and a fingerprint corresponding to the selected value, based on identifying a mathematical relationship of the selected value to one of a maximal value and a minimal value of the feature values;
   dividing the next sequence of fingerprints at the selected fingerprint into a part of an initial group of fingerprints and a part of a next group of fingerprints; and
   combining the part of the initial group of fingerprints with the initial sequence of fingerprints as the initial group of fingerprints.

5. The system of claim 4, wherein the similarity group identifier for the group of fingerprints is identified by determining an additional feature value for at least one fingerprint in the next sequence of fingerprints, based on selecting a series of bits from the at least one fingerprint, wherein the selected series of bits is mutually exclusive of any series of bits selected for any feature value, and identifying a mathematical relationship of the one of the at least one additional feature value to one of a maximal value and a minimal value of the at least one additional feature value.

6. The system of claim 1, wherein communicating the requested segments comprises communicating the requested segments in a compressed format.

7. The system of claim 1, wherein communicating the requested segments to the destination enables the destination to record the requested segments into a log, and a packer service to form at least one container comprising the requested segments and then to store the at least one container into a destination storage.

8. A computer program product comprising a non-transitory computer-readable medium having a computer-readable program code embodied therein to be executed by one or more processors, the program code including instructions to:
   identify, by an access object service, in response to receiving a request to copy a file to a destination, a similarity group identifier for a group of fingerprints corresponding to sequential segments in the file;
   communicate, by the access object service, a request for the group of fingerprints to a deduplication service associated with a range of similarity group identifiers that include the similarity group identifier;
   communicate, by the deduplication service, to the access object service, the group of fingerprints retrieved from fingerprint storage;
   communicate, by the access object service, the group of fingerprints and the similarity group identifier to the destination;
   communicate to the deduplication service by the access object service, a request communicated from the destination for segments of the file corresponding to fingerprints missing from the destination;
   communicate to the access object service by the deduplication service, the requested segments retrieved from a source storage;
   communicate, by the access object service, the requested segments to the destination;

identify, by one of the access object service and the deduplication service, a generation identifier at a first time of communicating;

identify, by the one of the access object service and the deduplication service, a generation identifier at a second time of communicating; and restart at least one communication by the one of the access object service and the deduplication service, in response to a determination that the generation identifiers at the first and second times differ.

9. The computer program product of claim 8, wherein restarting at least one communication is based on at least one checkpoint associated with at least one of a time of copying the file and an amount of the file copied, wherein communicating includes receiving a communication.

10. The computer program product of claim 8, wherein the access object service identifying the similarity group identifier for the group of fingerprints comprises a load balancer using an identifier of the file to select the access object service, from a plurality of access object services, for identifying the similarity group identifier for the group of fingerprints.

11. The computer program product of claim 8, wherein the group of fingerprints comprises sequential fingerprints in a stream of fingerprints, and is identified by:
grouping consecutive fingerprints in the stream of fingerprints until an initial sequence of fingerprints is formed which has a size that is larger than a minimum size;
grouping consecutive fingerprints which are next after the initial sequence of fingerprints until a next sequence of fingerprints is formed which combined with the initial sequence of fingerprints have a combined size that is larger than a maximum size;
determining a feature value for each fingerprint in the next sequence of fingerprints, based on selecting a series of bits from each fingerprint as each feature value;
selecting a value from the feature values, and a fingerprint corresponding to the selected value, based on identifying a mathematical relationship of the selected value to one of a maximal value and a minimal value of the feature values;
dividing the next sequence of fingerprints at the selected fingerprint into a part of an initial group of fingerprints and a part of a next group of fingerprints; and
combining the part of the initial group of fingerprints with the initial sequence of fingerprints as the initial group of fingerprints.

12. The computer program product of claim 11, wherein the similarity group identifier for the group of fingerprints is identified by determining an additional feature value for at least one fingerprint in the next sequence of fingerprints, based on selecting a series of bits from the at least one fingerprint, wherein the selected series of bits is mutually exclusive of any series of bits selected for any feature value, and identifying a mathematical relationship of the one of the at least one additional feature value to one of a maximal value and a minimal value of the at least one additional feature value.

13. The computer program product of claim 8, wherein communicating the requested segments comprises communicating the requested segments in a compressed format.

14. The computer program product of claim 8, wherein communicating the requested segments to the destination enables the destination to record the requested segments into a log, and a packer service to form at least one container comprising the requested segments and then to store the at least one container into a destination storage.

15. A computer-implemented method for source file copying and error handling comprising:
identifying, by an access object service executed by one or more processors, in response to receiving a request to copy a file to a destination, a similarity group identifier for a group of fingerprints corresponding to sequential segments in the file;
communicating, by the access object service, a request for the group of fingerprints to a deduplication service associated with a range of similarity group identifiers that include the similarity group identifier;
communicating, by the deduplication service executed by the one or more processors, to the access object service, the group of fingerprints retrieved from fingerprint storage;
communicating, by the access object service, the group of fingerprints and the similarity group identifier to the destination;
communicate to the deduplication service by the access object service, a request communicated from the destination for segments of the file corresponding to fingerprints missing from the destination;
communicating to the access object service by the deduplication service, the requested segments retrieved from a source storage;
communicating, by the access object service, the requested segments to the destination;
identify, by one of the access object service and the deduplication service, a generation identifier at a first time of communicating;
identifying, by the one of the access object service and the deduplication service, a generation identifier at a second time of communicating; and
restarting at least one communication by the one of the access object service and the deduplication service, in response to a determination that the generation identifiers at the first and second times differ.

16. The computer-implemented method of claim 15, wherein restarting at least one communication is based on at least one checkpoint associated with at least one of a time of copying the file and an amount of the file copied, wherein communicating includes receiving a communication.

17. The computer-implemented method of claim 15, wherein the access object service identifying the similarity group identifier for the group of fingerprints comprises a load balancer using an identifier of the file to select the access object service, from a plurality of access object services, for identifying the similarity group identifier for the group of fingerprints.

18. The computer-implemented method of claim 15, wherein the group of fingerprints comprises sequential fingerprints in a stream of fingerprints, and is identified by:
grouping consecutive fingerprints in the stream of fingerprints until an initial sequence of fingerprints is formed which has a size that is larger than a minimum size;
grouping consecutive fingerprints which are next after the initial sequence of fingerprints until a next sequence of fingerprints is formed which combined with the initial sequence of fingerprints have a combined size that is larger than a maximum size;
determining a feature value for each fingerprint in the next sequence of fingerprints, based on selecting a series of bits from each fingerprint as each feature value;
selecting a value from the feature values, and a fingerprint corresponding to the selected value, based on identifying a mathematical relationship of the selected value to one of a maximal value and a minimal value of the feature values;

dividing the next sequence of fingerprints at the selected fingerprint into a part of an initial group of fingerprints and a part of a next group of fingerprints; and combining the part of the initial group of fingerprints with the initial sequence of fingerprints as the initial group of fingerprints.

19. The computer-implemented method of claim 18, wherein the similarity group identifier for the group of fingerprints is identified by determining an additional feature value for at least one fingerprint in the next sequence of fingerprints, based on selecting a series of bits from the at least one fingerprint, wherein the selected series of bits is mutually exclusive of any series of bits selected for any feature value, and identifying a mathematical relationship of the one of the at least one additional feature value to one of a maximal value and a minimal value of the at least one additional feature value.

20. The computer-implemented method of claim 15, wherein communicating the requested segments comprises communicating the requested segments in a compressed format, and communicating the requested segments to the destination enables the destination to record the requested segments into a log, and a packer service to form at least one container comprising the requested segments and then to store the at least one container into a destination storage.

* * * * *